(12) United States Patent
Cao et al.

(10) Patent No.: US 10,764,828 B2
(45) Date of Patent: Sep. 1, 2020

(54) WAKEUP RADIO (WUR) PACKET MULTI-FORMAT DESIGN

(71) Applicant: NXP USA, Inc., Austin, TX (US)

(72) Inventors: Rui Cao, Fremont, CA (US); Hongyuan Zhang, Fremont, CA (US)

(73) Assignee: NXP USA, INC., Austin, TX (US)

( * ) Notice: Subject to any disclaimer, the term of this patent is extended or adjusted under 35 U.S.C. 154(b) by 0 days.

(21) Appl. No.: 16/155,701

(22) Filed: Oct. 9, 2018

(65) Prior Publication Data

US 2019/0124596 A1   Apr. 25, 2019

Related U.S. Application Data

(60) Provisional application No. 62/574,631, filed on Oct. 19, 2017.

(51) Int. Cl.
*H04W 52/02* (2009.01)
*H04L 5/00* (2006.01)
(Continued)

(52) U.S. Cl.
CPC ....... *H04W 52/0229* (2013.01); *H04L 5/0053* (2013.01); *H04L 27/2602* (2013.01);
(Continued)

(58) Field of Classification Search
CPC ......... H04W 52/0229; H04W 52/0235; H04W 80/02; H04W 84/12; H04W 52/02; H04W 52/0203; H04L 5/0053; H04L 27/2602
See application file for complete search history.

(56) References Cited

U.S. PATENT DOCUMENTS 8,331,419 B2   12/2012   Zhang et al.
8,332,732 B2   12/2012   Lakkis
(Continued)

FOREIGN PATENT DOCUMENTS

| CN | 107800526 A | 3/2018 |
| WO | WO-2009/059229 | 5/2009 |
| WO | WO-2018/032774 A1 | 2/2018 |

OTHER PUBLICATIONS

IEEE P802.11ax™/D1.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 453 pages (Nov. 2016).

(Continued)

*Primary Examiner* — Sharad Rampuria

(57) ABSTRACT

A communication device determines a physical layer (PHY) transmission mode for transmitting a wakeup radio (WUR) packet. The communication device generates a first portion of the WUR packet, the first portion corresponding to a WLAN legacy PHY preamble and spanning a first frequency bandwidth. The communication device generates a second portion of the WUR packet, the second portion of the WUR packet spanning a second frequency bandwidth that is less than the first frequency bandwidth. The second portion of the WUR packet includes a PHY sync signal that corresponds to the selected PHY transmission mode, wherein the PHY sync signal is selected from a plurality of different PHY sync signals that respectively correspond to a plurality of different PHY transmission modes. The communication (Continued)

device generates a PHY data portion, within the second portion of the WUR packet, according to the selected transmission mode.

24 Claims, 12 Drawing Sheets

(51) Int. Cl.
    *H04L 27/26*     (2006.01)
    *H04W 80/02*     (2009.01)
    *H04W 84/12*     (2009.01)

(52) U.S. Cl.
    CPC ........ *H04W 52/0235* (2013.01); *H04W 80/02* (2013.01); *H04W 84/12* (2013.01)

(56) References Cited

U.S. PATENT DOCUMENTS

| | | |
|---|---|---|
| 8,527,853 B2 | 9/2013 | Lakkis |
| 9,801,133 B2 * | 10/2017 | Min .................. H04W 52/0229 |
| 9,826,483 B2 * | 11/2017 | Park .................. H04W 52/0229 |
| 10,015,745 B2 * | 7/2018 | Azizi .................... H04L 5/0053 |
| 10,129,064 B1 | 11/2018 | Lee et al. |
| 2006/0067444 A1 | 3/2006 | Hamamoto |
| 2010/0166113 A1 | 7/2010 | Farley et al. |
| 2014/0112225 A1 | 4/2014 | Jafarian et al. |
| 2015/0208349 A1 | 7/2015 | Ramamurthy et al. |
| 2016/0366644 A1 * | 12/2016 | Ghosh ............... H04W 52/0229 |
| 2016/0374020 A1 | 12/2016 | Azizi et al. |
| 2017/0094600 A1 | 3/2017 | Min et al. |
| 2017/0111858 A1 | 4/2017 | Azizi et al. |
| 2018/0019902 A1 | 1/2018 | Suh et al. |
| 2018/0020405 A1 | 1/2018 | Huang et al. |
| 2018/0020409 A1 | 1/2018 | Aboul-Magd et al. |
| 2018/0132176 A1 | 5/2018 | Abraham et al. |
| 2018/0184378 A1 | 6/2018 | Fang et al. |
| 2018/0184379 A1 | 6/2018 | Liu et al. |
| 2018/0206192 A1 | 7/2018 | Vermani et al. |
| 2018/0255514 A1 | 9/2018 | Sun et al. |
| 2018/0324717 A1 | 11/2018 | Zhou et al. |
| 2018/0376370 A1 | 12/2018 | Shellhammer et al. |
| 2019/0082385 A1 | 3/2019 | Shellhammer et al. |
| 2019/0124596 A1 | 4/2019 | Cao et al. |

OTHER PUBLICATIONS

IEEE P802.11 ax™/D2.2, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 620 pages (Feb. 2018).

IEEE Std 802.11-REVmc™/D8.0 (revision of IEEE Std. 802.11™-2012) "Draft Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, 3774 pages (Aug. 2016).

IEEE Std 802.11ad™/D9.0 "Draft Standard for Information technology—Telecommunications and information Exchange Between Systems—Local and Metropolitan Area Networks—Specific Requirements" Part 11: Wireless LAN Medium Access Control (MAC) and Physical Layer (PHY) Specifications, Amendment 3: Enhancements for Very High Throughput in the 60 GHz Band *The Institute of Electrical and Electronics Engineers, Inc.*, pp. 1-679 (Jul. 2012).

Park et al., "Proposal for Wake-Up Receiver (WUR) Study Group," IEEE Draft 802.11-16/0722r1, 14 pages (May 18, 2016).

U.S. Appl. No. 62/511,516, Cao et al., "Wake-Up Radio (WUR) Preamble Design," filed May 26, 2017.

U.S. Appl. No. 15/985,480, Cao et al., "Wakeup Radio (WUR) Preamble Design," filed May 21, 2018.

U.S. Appl. No. 16/049,732, Balakrishnan et al., "Wakeup Radio (WUR) Packet Preamble Design," filed Jul. 30, 2018.

U.S. Appl. No. 16/030,264, Ma et al., "Wakeup Packet Modulation and Demodulation," filed Jul. 9, 2018.

International Search Report and Written Opinion in International Patent Application No. PCT/US2018/055045, dated Dec. 7, 2018 (12 pages).

Lim et al., "Consideration on WUR Frame Structure," IEEE Draft 802.11-17/0036r0, vol. 802.11ba, 14 pages (Jan. 15, 2017).

* cited by examiner

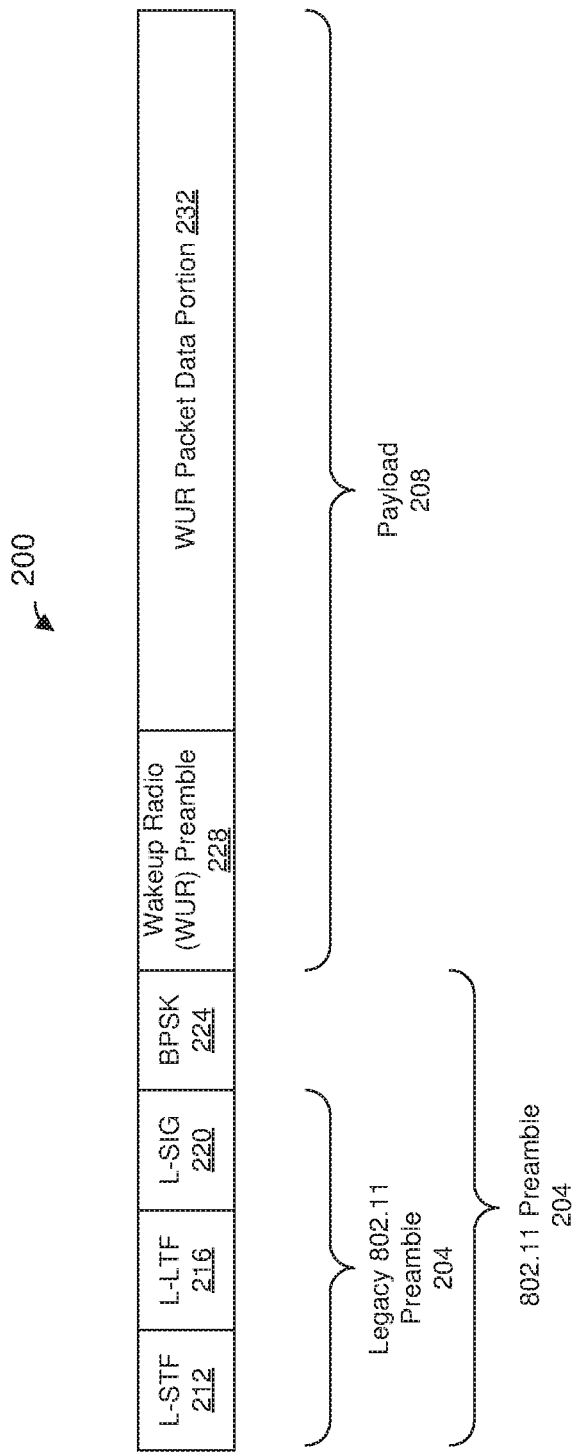

WAKEUP RADIO (WUR) PACKET MULTI-FORMAT DESIGN

CROSS REFERENCES TO RELATED APPLICATIONS

This application claims the benefit of U.S. Provisional Patent Application No. 62/574,631, entitled "Wake-Up Radio Dual Frame Format Design," filed on Oct. 19, 2017, which is hereby incorporated herein by reference in its entirety.

FIELD OF TECHNOLOGY

The present disclosure relates generally to wireless communication systems, and more particularly to formats of packets for communication systems employing wakeup radios (WURs).

BACKGROUND

Wireless local area networks (WLANs) have evolved rapidly over the past decade, and development of WLAN standards such as the Institute for Electrical and Electronics Engineers (IEEE) 802.11 Standard family has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughput, such as throughputs in the tens of Gbps range.

Some WLANs include low cost wireless devices, such as wireless sensors, that do not require high data rates. To reduce operating costs, it may be useful for such wireless devices to be battery operated or otherwise power constrained. Power saving techniques for reducing power consumption are used with such power-constrained wireless devices. For example, a WLAN network interface of a power-constrained wireless device is put into to a low power state (e.g., a sleep state) for periods of time in order to decrease power consumption of the wireless device. When the wireless device is ready to transmit data to an access point, the WLAN network interface is transitioned to an active state so that the data can be transmitted. After the WLAN network interface transmits the data, the WLAN network interface transitions back to the low power state.

A WLAN network interface of a power-constrained wireless device may "wake up" periodically to listen for transmissions from the access point to determine whether the access point has data to transmit to the wireless device. However, such periodic "wake ups" by the WLAN network interface consume power even when the access point has no data to transmit to the wireless device. Therefore, to further reduce power consumption, some wireless devices employ a low power wakeup radio (LP-WUR) that consumes much less power as compared to the WLAN network interface. For example, the LP-WUR does not include any transmitter circuitry and may be capable of only receiving very low data rate transmissions. When the access point is ready to transmit data to the wireless device, the access point transmits a wakeup radio (WUR) wakeup packet (referred to herein simply as a "wakeup packet") addressed to the wireless device. In response to receiving the wakeup packet and determining that the wakeup packet is addressed to the wireless device, the LP-WUR wakes up the WLAN network interface so that the WLAN network interface is ready to receive data from the access point.

SUMMARY

In an embodiment, a method is performed by a first communication device, for transmitting a wakeup radio (WUR) packet to a WUR of a second communication device, wherein the second communication device includes a separate wireless local area network (WLAN) network interface device coupled to the WUR. The method includes: determining, at the first communication device, a physical layer (PHY) transmission mode for transmitting the WUR packet, wherein the determined PHY transmission mode is selected from a plurality of different PHY transmission modes; generating, at the first communication device, a first portion of the WUR packet, wherein the first portion of the WUR packet corresponds to a WLAN legacy PHY preamble of the WUR packet, and wherein the first portion spans a first frequency bandwidth; generating, at the first communication device, a second portion of the WUR packet, wherein the second portion of the WUR packet spans a second frequency bandwidth that is less than the first frequency bandwidth. Generating the second portion of the WUR packet includes: generating the second portion of the WUR packet to include a PHY sync signal that corresponds to the selected PHY transmission mode, wherein the PHY sync signal is selected from a plurality of different PHY sync signals that respectively correspond to the plurality of different PHY transmission modes; and generating a PHY data portion, within the second portion of the WUR packet, according to the selected transmission mode. The method further comprises: transmitting, by the first communication device, the WUR packet.

In another embodiment, an apparatus comprises: a network interface device associated with a first communication device. The network interface device comprises one or more integrated circuit (IC) devices configured to: determine a physical layer (PHY) transmission mode for transmitting a wakeup radio (WUR) packet, wherein the determined PHY transmission mode is selected from a plurality of different PHY transmission modes; generate a first portion of the WUR packet, wherein the first portion of the WUR packet corresponds to a wireless local area network (WLAN) legacy PHY preamble of the WUR packet, and wherein the first portion spans a first frequency bandwidth; generate a second portion of the WUR packet, wherein the second portion of the WUR packet spans a second frequency bandwidth that is less than the first frequency bandwidth, and wherein generating the second portion of the WUR packet includes: generating the second portion of the WUR packet to include a PHY sync signal that corresponds to the selected PHY transmission mode, wherein the PHY sync signal is selected from a plurality of different PHY sync signals that respectively correspond to the plurality of different PHY transmission modes, and generating a PHY data portion, within the second portion of the WUR packet, according to the selected transmission mode. The one or more IC devices are further configured to: transmit the WUR packet to a second communication device that includes a WUR coupled to a WLAN network interface device.

In yet another embodiment, a method is performed by a communication device that includes i) a wakeup radio (WUR), and ii) a wireless local area network (WLAN) network interface device coupled to the WUR. The method includes: receiving, at the WUR, a WUR packet, wherein the WUR packet includes: i) a first portion that a) spans a first frequency bandwidth, and b) includes a WLAN legacy PHY preamble, and ii) a second portion that a) spans a second frequency bandwidth that is less than the first frequency bandwidth, and b) includes a PHY sync signal and a PHY data portion; determining, at the WUR, to which known PHY sync signal, from among a plurality of different known PHY sync signals, the PHY sync signal in the WUR packet corresponds, wherein the plurality of different known PHY sync portions respectively correspond to a plurality of different PHY transmission modes; determining, at the WUR, a PHY transmission mode, from among the plurality of different PHY transmission modes, according to which the WUR packet was transmitted using the determination of the known PHY sync signal to which the PHY sync signal in the WUR packet corresponds; and processing, at the WUR, the PHY data portion according to the determined PHY transmission mode.

In still another embodiment, an apparatus comprises: a wakeup radio WUR associated with a wireless local area network (WLAN) network interface device. The WUR comprises one or more integrated circuit (IC) devices configured to: receive a WUR packet, wherein the WUR packet includes: i) a first portion that a) spans a first frequency bandwidth, and b) includes a WLAN legacy PHY preamble, and ii) a second portion that a) spans a second frequency bandwidth that is less than the first frequency bandwidth, and b) includes a PHY sync signal and a PHY data portion; determine to which known PHY sync signal, from among a plurality of different known PHY sync signals, the PHY sync signal in the WUR packet corresponds, wherein the plurality of different known PHY sync portions respectively correspond to a plurality of different PHY transmission modes; determine a PHY transmission mode, from among the plurality of different PHY transmission modes, according to which the WUR packet was transmitted using the determination of the known PHY sync signal to which the PHY sync signal in the WUR packet corresponds; and process the PHY data portion according to the determined PHY transmission mode.

BRIEF DESCRIPTION OF THE DRAWINGS

FIG. 2 is a diagram of an example wakeup radio (WUR) packet, according to an embodiment.

DETAILED DESCRIPTION

Techniques for generating and processing packets are described below in the context of low power wakeup radios merely for explanatory purposes. In other embodiments, packet generation and processing techniques are utilized in other types of wireless communication systems such as personal area networks (PANs), mobile communication networks such as cellular networks, metropolitan area networks (MANs), satellite communication networks, etc., that use a narrower bandwidth than WLANs.

Figure 1A:
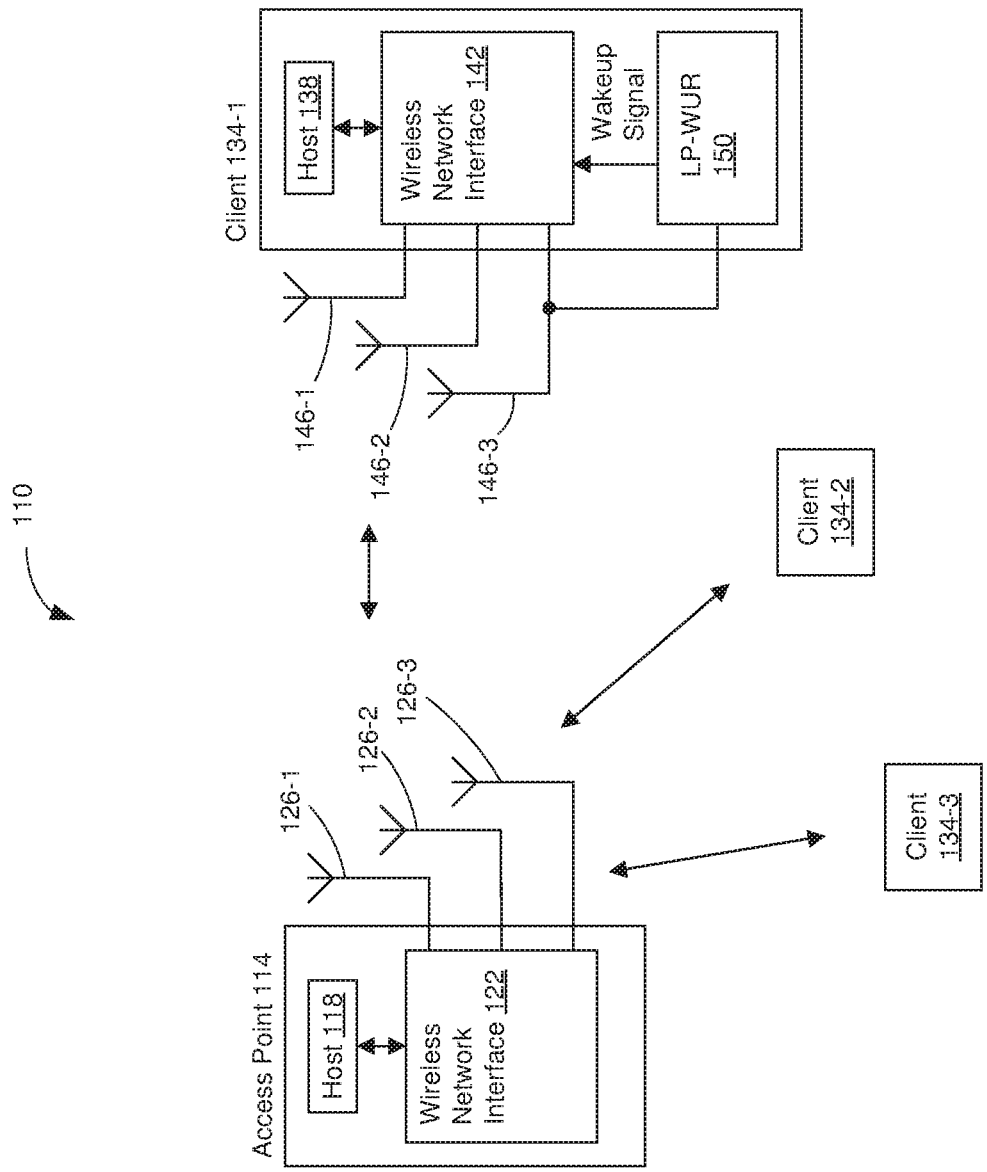
FIG. 1A is a block diagram of an example wireless local area network (WLAN) having a client station with a low power wakeup radio (LP-WUR), according to an embodiment.

FIG. 1A is a block diagram of an example MAN 110, according to an embodiment. The WLAN 110 includes an access point (AP) 114 that comprises a host processor 118 coupled to a wireless network interface device 122. The wireless network interface device 122 is coupled to a plurality of antennas 126. Although three antennas 126 are illustrated in FIG. 1A, the AP 114 includes other suitable numbers (e.g., 1, 2, 4, 5, etc.) of antennas 126 in other embodiments. As will be described in more detail below, the wireless network interface device 122 is configured to generate and transmit a wakeup packet that can be decoded by low power wakeup radios (LP-WURs) in the WLAN 110, wherein the wakeup packet is configured to prompt one or more of the LP-WURs to wake up a WLAN network interface coupled to the LP-WUR. Additionally, the wireless network interface device 122 is configured to generate packets that can be decoded by at least some of the LP-WURs (e.g., one or more of the LP-WURs) in the WLAN 110, and that include data information instead of, or in addition to, data configured to cause a LP-WUR to wake up a WLAN network interface (sometimes referred to herein as "non-wakeup data"). Packets that can be decoded by at least some of the LP-WURs are referred to herein as "WUR packets". WUR packets may be wakeup packets. WUR packets may also be packets that include non-wakeup data. Examples of non-wakeup data that may be included in WUR packets include WLAN beacon information, WUR capability information, WLAN capability information, WUR management data, WLAN management data, WUR control information, WLAN control information, etc. In an embodiment, the non-wakeup data can be used by the LP-WUR, and/or the WLAN network interface device that is coupled to the LP-WUR, for purposes other than waking up the WLAN network interface device.

The host processor 118 is configured to executed machine readable instructions stored in a memory device (not shown), according to an embodiment. The host processor 118 is implemented on an integrated circuit (IC), according to an embodiment. The wireless network interface device 122 is implemented on one or more ICs. The host processor 118 is implemented on one IC and the wireless network interface device 122 is implemented on one or more other, different ICs, according to an embodiment. The host processor 118 is implemented on a first IC and the wireless network interface device 122 is implemented on at least the same first IC and optionally on one or more second ICs, according to an embodiment.

The WLAN 110 also includes one or more client stations 134. Although three client stations 134 are illustrated in FIG. 1A, the WLAN 110 includes other suitable numbers (e.g., 1, 2, 4, 5, 6, etc.) of client stations 134 in various embodiments. The client station 134-1 includes a host processor 138 coupled to a wireless network interface device 142. The wireless network interface device 142 is coupled to one or more antennas 146. Although three antennas 146 are illustrated in FIG. 1A, the client station 134-1 includes other suitable numbers (e.g., 1, 2, 4, 5, etc.) of antennas 146 in other embodiments.

The wireless network interface device 142 is configured to go into a low power state in which the wireless network interface device 142 consumes significantly less power as compared to an active state of the wireless network interface device 142. The wireless network interface device 142 is capable of wirelessly receiving and transmitting via the one or more antennas 146 while in the active state. In an embodiment, the wireless network interface device 142 is incapable of wirelessly receiving and transmitting via the one or more antennas 146 while in the low power state.

The client station 134-1 also includes a LP-WUR 150 coupled to the wireless network interface device 142 and to at least one of the antennas 146. The LP-WUR 150 is configured to use very low power (e.g., less than 100 microwatts or another suitable amount of power). The LP-WUR 150 is configured to use significantly less power (e.g., less than 20%, less than 10%, less than 5%, less than 2%, less than 1%, etc.) than the wireless network interface device 142 while the wireless network interface device 142 is in the active state, according to an embodiment.

The LP-WUR 150 is configured to receive and decode wakeup packets transmitted by the AP 114 and received via one or more of the antennas 146. The LP-WUR 150 is configured to determine whether a received wakeup packet includes an address (e.g., a media access control (MAC) address, an association identifier (AID), or another suitable network address) corresponding to the client station 134-1, according to an embodiment. The LP-WUR 150 is configured to generate a wakeup signal in response to determining that a received wakeup packet includes the address corresponding to the client station 134-1. An address corresponding to the client station 134-1 includes one or more of i) a unicast address corresponding to the client station 134-1, ii) a multicast address corresponding to a group of client stations that includes the client station 134-1, and/or iii) a broadcast address that corresponds to all client stations, in various embodiments.

When the wireless network interface device 142 is in the low power state and receives the wakeup signal from the LP-WUR 150, the wireless network interface device 142 is configured to transition to the active power state in response to the wakeup according to an embodiment. For example, when the wireless network interface device 142 is in the low power state and receives the wakeup signal from the LP-WUR 150, the wireless network interface device 142 responsively transitions to the active power state to become ready to transmit and/or receive, according to an embodiment.

The host processor 138 is configured to executed machine readable instructions stored in a memory device (not shown), according to an embodiment. The host processor 138 is implemented on an IC, according to an embodiment. The wireless network interface device 142 is implemented on one or more ICs. The host processor 138 is implemented on one IC and the wireless network interface device 142 is implemented on one or more other, different ICs, according to an embodiment. The host processor 138 is implemented on a first IC and the wireless network interface device 142 is implemented on at least the same first IC and optionally on one or more second ICs, according to an embodiment.

The LP-WUR 150 is implemented on one IC and the wireless network interface device 142 is implemented on one or more other, different ICs, according to an embodiment. The LP-WUR 150 is implemented on a first IC and the wireless network interface device 142 is implemented on at least the same first IC and optionally on one or more second ICs, according to an embodiment.

In an embodiment, the LP-WUR 150 is configured to process wakeup packets that are transmitted at a particular data rate, and is not configured to process WUR packets that include non-wakeup data and/or to process WUR packets at a data rate other than the particular data rate (such LP-WURs are sometimes referred to herein as "basic LP-WURs"). In some embodiments, the LP-WUR 150 is configured to process WUR packets that are transmitted at multiple different data rates, and/or is configured to process WUR packets that include non-wakeup data (such LP-WURs are sometimes referred to herein as "advanced LP-WURs"). A mode of operation in which a WUR packet that includes a wakeup packet is transmitted at the particular data rate is sometimes referred to as a "basic mode". A mode of operation in which a WUR packet includes non-wakeup data and/or is transmitted at a data rate other than the particular data rate is sometimes referred to as an "advanced mode".

In an embodiment, each of the client stations 134-2 and 134-3 has a structure that is the same as or similar to the client station 134-1. For example, one or both of the client stations 134-2 and 134-3 includes a respective LP-WUR, according to an embodiment. As another example, one or both of the client stations 134-2 and 134-3 does not include a LP-WUR, according to another embodiment. In some embodiments, one or more of the client stations 134 are basic LP-WURs and one or more of the other client stations 134 are advanced LP-WURs.

Each of the client stations 134-2 and 134-3 has the same or a different number of antennas (e.g., 1, 2, 3, 4, 5, etc.). For example, the client station 134-2 and/or the client station 134-3 each have only two antennas (not shown), according to an embodiment.

Figure 1C:
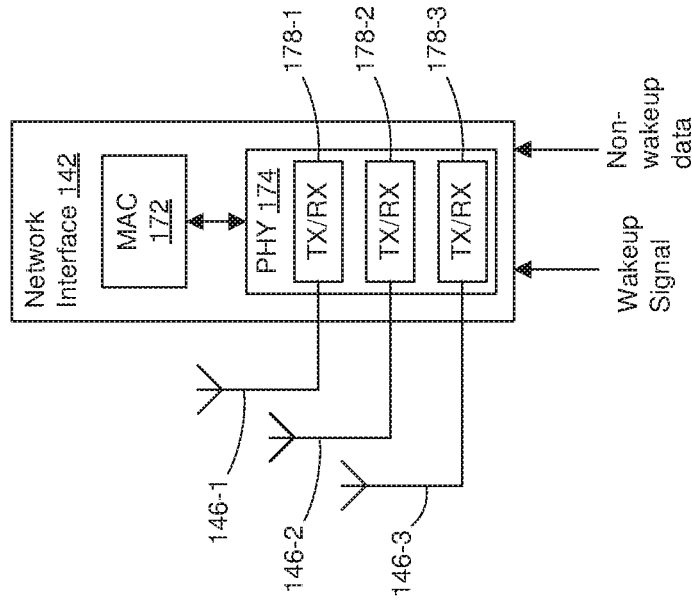
FIG. 1C is a block diagram of an example wireless network interface device of the client station included in the WAN of FIG. 1A, according to an embodiment.
Figure 1B:
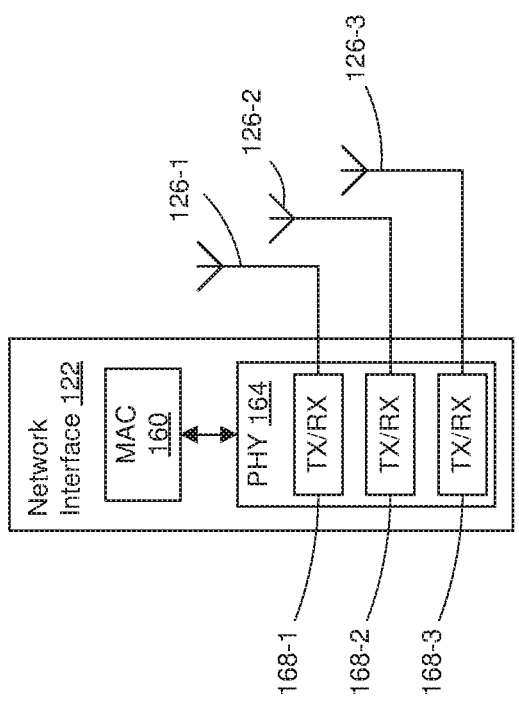
FIG. 1B is a block diagram of an example wireless network interface device of an access point included in the WLAN of FIG. 1A, according to an embodiment.

FIG. 1B is a block diagram of the network interface device 122 of the AP 114 of FIG. 1A, according to an embodiment. The network interface 122 includes a MAC layer processor 160 coupled to a physical layer (PHY) processor 164. The PHY processor 164 includes a plurality of transceivers 168 coupled to the plurality of antennas 126. Although three transceivers 168 and three antennas 126 are illustrated in FIG. 1B, the PHY processor 164 includes other suitable numbers (e.g., 1, 2, 4, 5, etc.) of transceivers 168 coupled to other suitable numbers of antennas 126 in other embodiments. In some embodiments, the AP 114 includes a higher number of antennas 126 than transceivers 168, and the PHY processor 164 is configured to use antenna switching techniques.

The network interface 122 is implemented using one or more ICs configured to operate as discussed below. For example, the MAC layer processor 160 may be implemented, at least partially, on a first IC, and the PHY processor 164 may be implemented, at least partially, on a second IC. As another example, at least a portion of the MAC layer processor 160 and at least a portion of the PHY processor 164 may be implemented on a single IC. For instance, the network interface 122 may be implemented using a system on a chip (SoC), where the SoC includes at least a portion of the MAC layer processor 160 and at least a portion of the PHY processor 164.

In various embodiments, the MAC layer processor 160 and/or the PHY processor 164 of the AP 114 are configured to generate data units, and process received data units, that conform to a WLAN communication protocol such as a communication protocol conforming to the IEEE 802.11 Standard or another suitable wireless communication protocol. For example, the MAC layer processor 160 may be configured to implement MAC layer functions, including MAC layer functions of the WLAN communication protocol, and the PHY processor 164 may be configured to implement PHY functions, including PHY functions of the WLAN communication protocol. For instance, the MAC layer processor 160 may be configured to generate MAC layer data units such as MAC service data units (MSDUs), MAC protocol data units (MPDUs), etc., and provide the MAC layer data units to the PHY processor 164. The PHY processor 164 may be configured to receive MAC layer data units from the MAC layer processor 160 and encapsulate the MAC layer data units to generate PHY data units such as PHY protocol data units (PPDUs) for transmission via the antennas 126. Similarly, the PHY processor 164 may be configured to receive PHY data units that were received via the antennas 126, and extract MAC layer data units encapsulated within the PHY data units. The PHY processor 164 may provide the extracted MAC layer data units to the MAC layer processor 160, which then processes the MAC layer data units. PHY data units that conform to the WLAN communication protocol are sometimes referred to herein as "WLAN packets". MAC data units that conform to the WLAN communication protocol are sometimes referred to herein as "WLAN frames".

In connection with generating one or more radio frequency (RF) signals for transmission, the PHY processor 164 is configured to process (which may include modulating, filtering, etc.) data corresponding to a PPDU to generate one or more digital baseband signals, and convert the digital baseband signal(s) to one or more analog baseband signals, according to an embodiment. Additionally, the PHY processor 164 is configured to upconvert the one or more analog baseband signals to one or more RF signals for transmission via the one or more antennas 138.

In connection with receiving one or more RF signals, the PHY processor 164 is configured to downconvert the one or more RF signals to one or more analog baseband signals, and to convert the one or more analog baseband signals to one or more digital baseband signals. The PHY processor 164 is further configured to process (which may include demodulating, filtering, etc.) the one or more digital baseband signals to generate a PPDU.

The PHY processor 164 includes amplifiers (e.g., a low noise amplifier (LNA), a power amplifier, etc.), a radio frequency (RF) downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc.

The PHY processor 164 is configured to generate one or more RF signals that are provided to the one or more antennas 126. The PHY processor 164 is also configured to receive one or more RF signals from the one or more antennas 126.

The MAC processor 160 is configured to control the PHY processor 164 to generate one or more RF signals by, for example, providing one or more MAC layer data units (e.g., MPDUs) to the PHY processor 164, and optionally providing one or more control signals to the PHY processor 164, according to some embodiments. In an embodiment, the MAC processor 160 includes a processor configured to execute machine readable instructions stored in a memory device (not shown) such as a RAM, a read ROM, a flash memory, etc. In an embodiment, the MAC processor 160 includes a hardware state machine.

In an embodiment, the PHY processor 164 is configured to generate wakeup packets and transmit the wakeup packets at the particular data rate; and the PHY processor 164 is also configured to i) generate WUR packets that include non-wakeup data and/or ii) transmit WUR packets at a data rate other than the particular data rate.

FIG. 1C is a block diagram of the network interface device 142 of the client station 134-1 of FIG. 1A, according to an embodiment, The network interface 142 includes a MAC layer processor 172 coupled to a PHY processor 174. The PHY processor 174 includes a plurality of transceivers 178 coupled to the one or more antennas 146. Although three transceivers 178 and three antennas 126 are illustrated in FIG. 1C, the PHY processor 174 includes other suitable numbers (e.g., 1, 2, 4, 5, etc.) of transceivers 178 coupled to other suitable numbers of antennas 146 in other embodiments. In some embodiments, the client station 134-1 includes a higher number of antennas 146 than transceivers 178, and the PHY processor 174 is configured to use antenna switching techniques.

The network interface 142 is implemented using one or more ICs configured to operate as discussed below. For example, the MAC layer processor 172 may be implemented, at least partially, on a first IC, and the PHY processor 174 may be implemented, at least partially, on a second IC. As another example, at least a portion of the MAC layer processor 172 and at least a portion of the PHY processor 174 may be implemented on a single IC. For instance, the network interface 142 may be implemented using a system on a chip (SoC), where the SoC includes at least a portion of the MAC layer processor 172 and at least a portion of the PHY processor 174.

In various embodiments, the MAC layer processor 172 and the PHY processor 174 of the client device 134-1 are configured to generate data units, and process received data units, that conform to the WLAN communication protocol or another suitable communication protocol. For example, the MAC layer processor 172 may be configured to implement MAC layer functions, including MAC layer functions of the WLAN communication protocol, and the PHY processor 174 may be configured to implement PHY functions, including PHY functions of the WLAN communication protocol. The MAC layer processor 172 may be configured to generate MAC layer data units such as MSDUs, MPDUs, etc., and provide the MAC layer data units to the PHY processor 174. The PHY processor 174 may be configured to receive MAC layer data units from the MAC layer processor 172 and encapsulate the MAC layer data units to generate PHY data units such as PPDUs for transmission via the one or more antennas 146. Similarly, the PHY processor 174 may be configured to receive PHY data units that were received via the one or more antennas 146, and extract MAC layer data units encapsulated within the PHY data units. The PHY processor 174 may provide the extracted MAC layer data units to the MAC layer processor 172, which then processes the MAC layer data units.

As discussed above, the network interface device 142 is configured to transition between an active state and a low power state. When the wireless network interface device 142 is in the low power state and receives the wakeup signal from the LP-WUR 150, the wireless network interface device 142 is configured to transition to the active power state in response to the wakeup signal, according to an embodiment.

The PHY processor 174 is configured to downconvert one or more RF signals received via the one or more antennas 146 to one or more baseband analog signals, and convert the analog baseband signal(s) to one or more digital baseband signals, according to an embodiment. The PHY processor 174 is further configured to process the one or more digital baseband signals to demodulate the one or more digital baseband signals and to generate a PPDU. The PHY processor 174 includes amplifiers (e.g., an LNA, a power amplifier, etc.), an RF downconverter, an RF upconverter, a plurality of filters, one or ADCs, one or more DACs, one or more DFT calculators (e.g., a fast Fourier transform (FFT) calculator), one or more IDFT calculators (e.g., an inverse fast Fourier transform (IFFT) calculator), one or more modulators, one or more demodulators, etc.

The PHY processor 174 is configured to generate one or more RF signals that are provided to the one or more antennas 146. The PHY processor 174 is also configured to receive one or more RE signals from the one or more antennas 146.

The MAC processor 172 is configured to control the PHY processor 174 to generate one or more RE signals by, for example, providing one or more MAC layer data units (e.g., MPDUs) to the PHY processor 174, and optionally providing one or more control signals to the PHY processor 174, according to some embodiments. In an embodiment, the MAC processor 172 includes a processor configured to execute machine readable instructions stored in a memory device (not shown) such as a RAM, a read ROM, a flash memory, etc. In an embodiment, the MAC processor 172 includes a hardware state machine.

In some embodiments in which the wireless network interface device 142 is coupled to an advanced LP-WUR, the wireless network interface device 112 is configured to receive non-wakeup data from the LP-WUR 150, such as WLAN beacon information, WUR capability information, WLAN capability information, WUR configuration information, WLAN configuration information, WUR management information, WLAN management information, WUR control information, WLAN control information, etc. In an embodiment, the wireless network interface device 142 is configured to use the non-wakeup data for purposes other than transitioning to the active power state. For example, the MAC processor 172 of the wireless network interface device 142 is configured to use the non-wakeup data for performing MAC-related functions related to WLAN communications.

In some embodiments in which the wireless network interface device 142 is coupled to a basic LP-WUR, the wireless network interface device 142 is not configured to receive non-wakeup data from the LP-WUR 150.

Figure 1D:
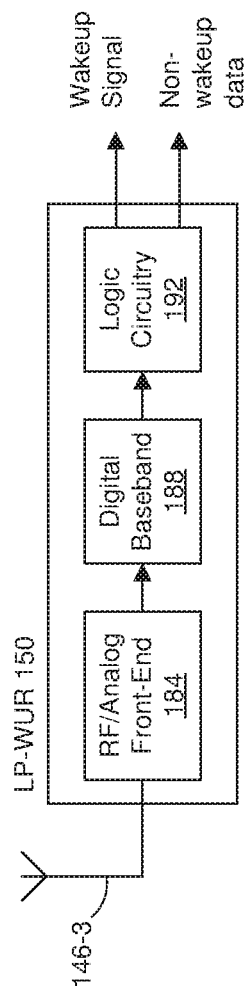
FIG. 1D is a block diagram of an example LP-WUR in the WLAN of FIG. 1A, according to an embodiment.

FIG. 1D is a block diagram of the LP-WUR 150 of the client station 134-1 of FIG. 1A, according to an embodiment. The LP-WUR 150 includes radio frequency (RF)/analog front-end circuitry 184 coupled to at least one of the antennas 146. The RE/analog front-end circuitry 184 includes one or more amplifiers (e.g., a low noise amplifier (LNA)), an RF downconverter, one or more filters, and one or more analog-to-digital converters (ADCs). In an embodiment, the RF/analog front-end circuitry 184 is configured to downconvert an RF signal to a baseband analog signal, and convert the analog baseband signal to a digital baseband signal.

The RF/analog front-end circuitry 184 is coupled to digital baseband circuitry 188. The digital baseband circuitry 188 is configured to process the digital baseband signal to determine whether the digital baseband signal corresponds to a WUR packet. The digital baseband circuitry 188 includes a demodulator that demodulates data from the digital baseband signal to generate an information signal corresponding to information included in a wakeup packet.

In some embodiments in which the LP-WUR 150 is a basic LP-WUR, the digital baseband circuitry 188 is configured to assume that WUR packets are transmitted at a fixed data rate. In some embodiments in which the LP-WUR 150 is a basic LP-WUR, the digital baseband circuitry 188 is configured to assume that WUR packets are a fixed length.

In some embodiments in which the LP-WUR 150 is an advanced LP-WUR, the digital baseband circuitry 188 is configured to assume that WUR packets can be transmitted at multiple different data rates, and is configured to determine the data rate of a particular packet using techniques described below. In some embodiments in which the LP-WUR 150 is an advanced LP-WUR, the digital baseband circuitry 188 is configured to assume that WUR packets have different lengths, and is configured to determine the length of a particular packet using techniques described below.

The digital baseband circuitry 188 is coupled to logic circuitry 192. The logic circuitry 192 is configured to process the information signal to determine whether the information signal includes an address e.g., a MAC address, an AID, or another suitable network address) corresponding to the client station 134-1, according to an embodiment. In embodiments in which the LP-WUR 150 is a basic LP-WUR, the logic circuitry 192 is configured to generate the wakeup signal in response to determining that the information signal includes the address corresponding to the client station 134-1. In embodiments in which the LP-WUR 150 is an advanced LP-WUR, the logic circuitry 192 is configured to generate the wakeup signal in response to determining that the information signal corresponds to a wakeup packet that includes the address corresponding to the client station 134-1.

In embodiments in which the LP-WUR 150 is an advanced LP-WUR, the LP-WUR 150 is configured to provide non-wakeup data, such as WLAN beacon information, WUR capability information, WLAN capability information, WUR configuration information, WLAN configuration information, WUR management information, WLAN management information, WUR control information, WLAN control information, etc., to the wireless network interface device 142. In some embodiments in which the LP-WUR 150 is an advanced LP-WUR, the LP-WUR 150 is configured to use at least some types of non-wakeup data such as WUR capability information, WUR configuration information, WUR management information, WUR control information, etc.

In some embodiments in which the LP-WUR 150 is an advanced LP-WUR, the LP-WUR 150 includes, in addition to or instead of the logic circuitry 192, a processor (not shown) that is configured to execute machine readable instructions stored in a memory (not shown) of the LP-WUR 150. In some embodiments, the processor (not shown) of the LP-WUR 150 is configured to execute machine readable instructions to one or more of: i) process and/or use non-wakeup data, ii) provide non-wakeup data to the network interface device 142, iii) generate the wakeup signal, etc.

Referring to FIG. 1A, the network 110 includes at least one client station 134 having a basic LP-WUR and at least one client station 134 having an advance LP-WUR, according to an embodiment. In another embodiment, all of the client stations 134 have advanced LP-WURs.

FIG. 2 is a block diagram of a WUR packet 200 used in the example WLAN 110 of FIG. 1, according to an embodiment. The network interface 122 of the AP 114 is configured to generate and transmit the WUR packet 200, according to an embodiment. The network interface 142 of the client station 134-1 is also configured to generate and transmit the WUR packet 200, e.g., to another client station 134, according to another embodiment.

The LP-WUR 150 of the client station 134-1 is configured to receive, detect, and decode the WUR packet 200, according to an embodiment.

The WUR packet 200 includes an 802.11 preamble portion 204 and a payload 208. The 802.11 preamble portion 204 enables IEEE 802.11 stations (e.g., wireless communication devices that are configured to operate according to the IEEE 802.11 Standard) to detect the WUR packet 200 and determine a length of the WUR packet 200 for the purpose of reducing transmissions by IEEE 802.11 stations that will collide with the WUR packet 200, according to an embodiment.

The 802.11 preamble portion 204 includes a legacy 802.11 preamble 210, which corresponds to a legacy preamble defined by the IEEE 802.11 Standard, according to an embodiment. The legacy 802.11 preamble 210 includes a legacy short training field (L-STF) 212, a legacy long training field (L-LTF) 216, and a legacy signal field (L-SIG) 220. The L-STF 212 includes signals designed for packet detection and automatic gain control (AGC) training, for example. The L-LTF 216 includes signals designed for channel estimation, for example. The L-SIG 220 includes information regarding the WUR packet 200, including length information (e.g., in a length subfield (not shown)) that can be used by IEEE 802.11 stations to determine when the WUR packet 200 will end.

In other embodiments, the WUR packet 200 includes a legacy preamble (different than the legacy 802.11 preamble 210) that enables stations that conform to a different suitable wireless communication protocol (e.g., other than the IEEE 802.11 Standard) to detect the WUR packet 200 and determine a length of the WUR packet 200 for the purpose of reducing transmissions by such stations that will collide with the WUR packet 200, according to an embodiment.

In an embodiment, the 802.11 preamble portion 204 also includes an orthogonal frequency division multiplexing (OFDM) symbol 224 having binary phase shift keying (BPSK) modulated OFDM subcarriers that follows the legacy 802.11 preamble 210. In an embodiment, the OFDM symbol 224 is a repetition of the L-SIG 220. In an embodiment, the OFDM symbol 224 is identical to at least a portion of the L-LTF 216. In other embodiments, the OFDM symbol 224 includes any other suitable signal and/or information. In an embodiment, the OFDM symbol 224 does not convey any useful information to recipient communication devices. In another embodiment, the OFDM symbol 224 does convey useful information to recipient communication devices. In some embodiments, the OFDM symbol 224 is omitted from the WUR packet 200.

The payload 208 includes a WUR preamble 228. In an embodiment, the WUR preamble 228 includes signals that enable LP-WURs such as the LP-WUR 150 to detect the payload 208 of the WUR packet 200 and to synchronize to the payload 208 of the WUR packet 200. The payload 208 also includes a WUR packet data portion 232. In an embodiment, the WUR packet data portion 232 includes an address (e.g., a MAC address, an AID, or another suitable network address) corresponding to a client station (or client stations) to which the WUR packet 200 is intended. Referring now to FIG. 1D, the digital baseband circuitry 188 is configured to detect the WUR packet 200 at least by detecting the WUR preamble 228, according to an embodiment. The logic circuitry 192 is configured to process the WUR packet body 232 to determine whether the WUR packet body 232 includes an address (e.g., a MAC address, an AID, or another suitable network address) corresponding to the client station 134-1.

In an embodiment, the legacy 802.11 preamble 210 spans a first frequency bandwidth, and the WUR preamble 228 and the WUR packet data portion 232 span a second frequency bandwidth that is narrower than the first frequency bandwidth. For example, the first frequency bandwidth is 20 MHz and the second frequency bandwidth is a narrower bandwidth such as approximately 4 MHz (e.g. 4.06 MHz), or another suitable narrower bandwidth such as 1 MHz, 2 MHz, 5 MHz, 10 MHz, etc.

Figure 3:
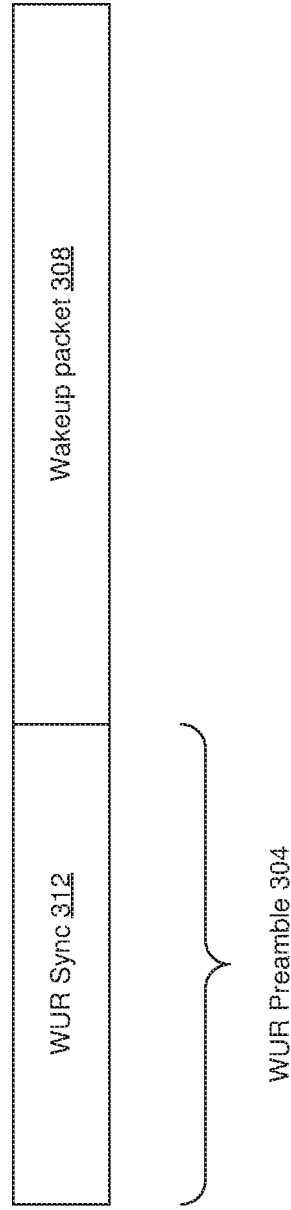
FIG. 3 is a diagram of an example payload of the WUR packet of FIG. 2 when the WUR packet is transmitted according to a first physical layer (PHY) transmission mode, according to an embodiment.

FIG. 3 is a diagram of an example payload portion 300 of a WUR packet (such as the WUR packet 200 of FIG. 2) that basic LP-WURs are configured to detect and process (sometimes referred to herein as a "base mode WUR packet"), according to an embodiment. The payload portion 300 is used as the payload 208 of the WUR packet 200 of FIG. 2, according to an embodiment. FIG. 3 is described in the context of the WUR packet 200 of FIG. 2 for explanatory purposes. In other embodiments, however, the payload portion 300 is included in another suitable WUR packet different that the WUR packet 200 of FIG. 2.

The payload portion 300 includes a WUR preamble 304 and a wakeup packet 308 (e.g., corresponding to the WUR data portion 232 of FIG. 2). The WUR preamble 304 includes a WUR sync portion 312. The WUR sync portion 312 is used by a wakeup radio (e.g., the LP-WUR 150 of FIG. 1) for one or more of carrier sensing, detection of the payload portion 300, synchronization to the payload portion 300, etc.

In an embodiment, the payload portion 300 is modulated/encoded according to a fixed data rate defined by a communication protocol. As an illustrative embodiment, the payload portion 300 has a data rate of 62.5 kilobits per second (kbps). In other embodiments, the payload portion 300 has another suitable data rate other than 62.5 kbps (e.g., 250 kbps or another suitable data rate). As an illustrative embodiment, the payload portion 300 is modulated using on-off keying (OOK) modulation. In other embodiments, the payload portion 300 is modulated using another suitable modulation scheme other than OOK.

In an embodiment, the payload portion 300 has a fixed length defined by the communication protocol. As an illustrative embodiment, the payload portion 300 has a length of 48 bits. As another illustrative embodiment, the payload portion 300 has a length of 20 bits. In other embodiments, the payload portion 300 has another suitable length other than 48 bits or 20 bits. As an illustrative embodiment, the payload portion 300 consists of a 16 bit station identifier (ID) and/or basic service set (BSS) color field and a 4 bit error detection field (e.g., a cyclic redundancy check (CRC) field). The station ID/BSS color field includes a network address that indicates which client station(s) is/are to be woken up. In other embodiments, the payload portion 300 includes one or more other suitable fields and/or omits the error detection field. In other embodiments, the station ID/BSS color field and/or the error detection field have other suitable lengths.

Figure 4:
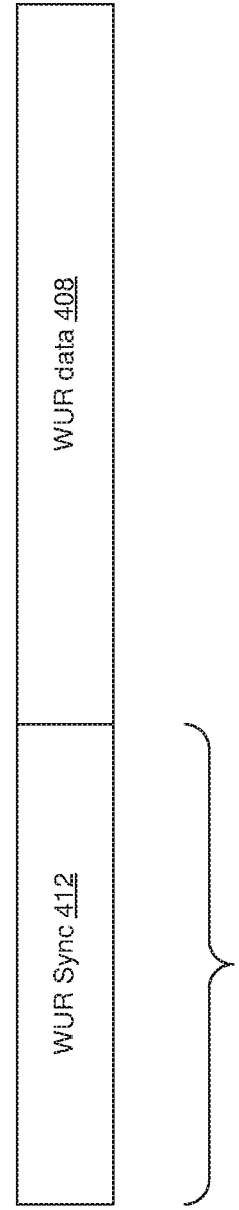
FIG. 4 is a diagram of an example payload of the WUR packet of FIG. 2 when the WUR packet is transmitted according to a second PHY transmission mode, according to an embodiment.

FIG. 4 is a diagram of an example payload portion 400 of a WUR packet (such as the WUR packet 200 of FIG. 2) that advanced LP-WURs are configured to detect and process (sometimes referred to herein as an "advanced mode WUR packet"), according to an embodiment. The payload portion 400 is used as the payload 208 of the WUR packet 200 of FIG. 2, according to an embodiment. FIG. 4 is described in the context of the WUR packet 200 of FIG. 2 for explanatory purposes. In other embodiments, however, the payload portion 400 is included in another suitable WUR packet different that the WUR packet 200 of FIG. 2.

The payload portion 400 includes a WUR preamble 404 and a WUR data portion 408 (e.g., corresponding to the WUR data portion 232 of FIG. 2). The WUR preamble 404 includes a WUR sync portion 412. The WUR sync portion 412 is used by a wakeup radio (e.g., the LP-WUR 150 of FIG. 1) for one or more of carrier sensing, detection of the payload portion 400, synchronization to the payload portion 400, etc.

In an embodiment in which the payload portion 300 (FIG. 3) of the base mode WUR packet is modulated/encoded according to a first fixed data rate, the payload portion 400 is modulated/encoded according to a second fixed data rate that is higher than the first fixed data rate. As an illustrative embodiment, the payload portion 300 (FIG. 3) of the base mode WUR packet has a data rate of 62.5 kbps, whereas the payload portion 400 of the advanced mode WUR packet has a data rate of 250 kbps. In other embodiments, the payload portion 400 has another suitable data rate other than 250 kbps. As an illustrative embodiment, the payload portion 400 is modulated using OOK. In other embodiments, the payload portion 400 is modulated using another suitable modulation scheme other than OOK.

In an embodiment, the payload portion 400 has a variable length. In an embodiment, the payload portion 400 comprises a data field and an error detection field (e.g., a CRC field, a frame check sequence (FCS) field, etc.). In other embodiments, the payload portion 400 includes one or more other suitable fields and/or omits the error detection field.

Referring now to FIGS. 3 and 4, the WUR sync field 312 and the WUR sync field 412 are configured to indicate to an advanced LP-WUR whether a WUR packet is a base mode WUR packet or and advanced mode WUR packet. In an embodiment, the WUR sync field 312 has a first duration and the WUR sync field 412 has a second duration that is different than the first duration. In an embodiment, the first duration is twice the second duration.

Referring now to FIGS. 1D, 3, and 4, the LP-WUR 150 is configured to detect the WUR sync 312 and the WUR sync 412 in WUR packets, according to an embodiment. When the LP-WUR 150 detects the WUR sync 312 in a WUR packet, the LP-WUR 150 processes the WUR packet according to a format of the base mode WUR packet; and when the LP-WUR 150 detects the WUR sync 412 in a WUR packet, the LP-WUR 150 processes the WUR packet according to a format of the advanced mode WUR packet. In some embodiments in which base mode WUR packets are transmitted at a first fixed data rate and advanced mode WUR packets are transmitted at a second fixed data rate (which is higher than the first fixed data rate): when the LP-WUR 150 detects the WUR sync 312 in a WUR packet, the LP-WUR 150 processes the WUR packet according to the first fixed data rate; and when the LP-WUR 150 detects the WUR sync 412 in a WUR packet, the LP-WUR 150 processes the WUR packet according to the second fixed data rate.

The digital baseband circuitry 188 is configured to detect the WUR sync 312 and the WUR sync 412 in WUR packets, according to an embodiment. When the digital baseband circuitry 188 detects the WUR sync 312 in a WUR packet, the digital baseband circuitry 188 and/or the logic circuitry 192 processes the WUR packet according to a format of the base mode WUR packet; and when the LP-WUR 150 detects the WUR sync 412 in a WUR packet, the digital baseband circuitry 188 and/or the logic circuitry 192 processes the WUR packet according to a format of the advanced mode WUR packet. In some embodiments in which base mode WUR packets are transmitted at a first fixed data rate and advanced mode WUR packets are transmitted at a second fixed data rate (which is higher than the first fixed data rate): when the digital baseband circuitry 188 detects the WUR sync 312 in a WUR packet, the digital baseband circuitry 188 processes the WUR packet according to the first fixed data rate; and when the digital baseband circuitry 188 detects the WUR sync 412 in a WUR packet, the digital baseband circuitry 188 processes the WUR packet according to the second fixed data rate.

In an embodiment, when the digital baseband circuitry 188 detects the WUR sync 312 in a WUR packet, the digital baseband circuitry 188 generates a signal that indicates to the logic circuitry 192 that the WUR packet is a base mode WUR packet; and when the LP-WUR 150 detects the WUR sync 412 in a WUR packet, the digital baseband circuitry 188 generates a signal that indicates to the logic circuitry 192 that WUR packet is an advanced mode WUR packet.

In an embodiment, basic LP-WURs are not capable of detecting the WUR sync 412 and/or assume that all WUR packets are base mode WUR packets; e.g., basic LP-WURs process all detected WUR packets as if they are base mode WUR packets. In some embodiments in which base mode WUR packets are transmitted at a first fixed data rate and advanced mode WUR packets are transmitted at a second fixed data rate (which is higher than the first fixed data rate):

basic LP-WURs process all detected WUR packets according to the first fixed data rate.

Figure 5A:
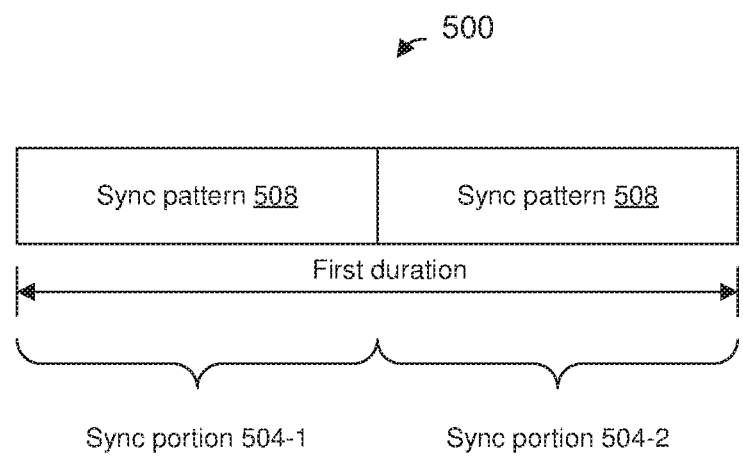
FIG. 5A is a diagram of an example WUR sync field of a WUR packet that is transmitted according to a first PHY transmission mode, according to an embodiment.
Figure 5B:
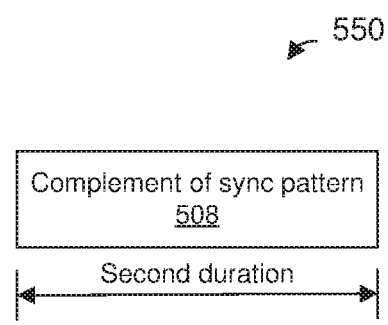
FIG. 5B is a diagram of an example WUR sync field of a WUR packet that is transmitted according to a second PHY transmission mode, according to an embodiment.

FIG. 5A is a diagram of an example WUR sync field 500 of a base mode WUR packet (e.g., the WUR sync field 312 of FIG. 3), and FIG. 5B is a diagram of an example WUR sync field 550 of an advanced mode WUR packet (e.g., the WUR sync field 412 of FIG. 4), according to an embodiment.

The WUR sync field 500 of the base mode WUR packet has a first duration, and the WUR sync field 550 of the advanced mode WUR packet has a second duration that is one half of the first duration (i.e., the first duration is twice the second duration). The WUR sync field 500 of the base mode WUR packet includes two sync portions 504, each including a sync pattern 508, i.e., the WUR sync field 500 includes two sync patterns 508. In an embodiment, the WUR sync field 500 consists of two sync portions 504, and each sync portion 504 consists of the sync pattern 508.

The WUR sync field 550 of the advanced mode WUR packet includes a single sync portion having a complement of the sync pattern 508. In an embodiment, the WUR sync field 550 consists of the complement of the sync pattern 508. In an embodiment, the complement of the sync pattern 508 is determined as one minus the sync pattern 508.

In other embodiments, the WUR sync field 500 of the base mode WUR packet and the WUR sync field 550 of the advanced mode WUR packet have other suitable formats. For example, the WUR sync field 550 of the advanced mode WUR packet includes (e.g., consists of) the sync pattern 508, whereas the WUR sync field 500 of the base mode WUR packet includes (e.g., consists of) i) the sync pattern 508 and ii) the complement of the sync pattern 508 transmitted after the sync pattern 508, according to an embodiment. As another example, the WUR sync field 550 of the advanced mode WUR packet includes (e.g., consists of) the sync pattern 508, whereas the WUR sync field 500 of the base mode WUR packet includes (e.g., consists of) i) the complement of the sync pattern 508 and ii) the sync pattern 508 transmitted after the complement of the sync pattern 508, according to an embodiment.

As another example, the WUR sync field 550 of the advanced mode WUR packet includes (e.g., consists of) the complement of the sync pattern 508, whereas the WUR sync field 500 of the base mode WUR packet includes (e.g., consists of) i) the sync pattern 508 and ii) the complement of the sync pattern 508 transmitted after the sync pattern 508, according to an embodiment. As another example, the WUR sync field 550 of the advanced mode WUR packet includes (e.g., consists of) the complement of the sync pattern 508, whereas the WUR sync field 500 of the base mode WUR packet includes (e.g., consists of) i) the complement of the sync pattern 508 and ii) the sync pattern 508 transmitted after the complement of the sync pattern 508, according to an embodiment.

As another example, the WUR sync field 550 of the advanced mode WUR packet includes (e.g., consists of) the complement of the sync pattern 508, whereas the WUR sync field 500 of the base mode WUR packet includes (e.g., consists of) two instances of the sync pattern 508, according to an embodiment.

In other embodiments, the duration of the WUR sync field 500 of the base mode WUR packet is M times the duration of the WUR sync field 550 of the advanced mode WUR packet, wherein M is a suitable positive integer (e.g., M is less than 5, M is less than 10, M is less than 20, M is less than 50, etc.). In an embodiment, the WUR sync field 550 of the advanced mode WUR packet includes (e.g., consists of) the sync pattern 508, whereas the WUR sync field 500 of the base mode WUR packet has a duration that is M times the duration of the WUR sync field 550, and the WUR sync field 500 includes (e.g., consists of) i) one instance of the complement of the sync pattern 508 and M-1 segments that consist of any suitable combination of a) zero, one, or more instances of the sync pattern 508 and b) zero, one, or more instances of the complement of the sync pattern 508. In another embodiment, the WUR sync field 550 of the advanced mode WUR packet includes (e.g., consists of) the complement of the sync pattern 508, whereas the WUR sync field 500 of the base mode WUR packet has a duration that is M times the duration of the WUR sync field 550, and the WUR sync field 500 includes (e.g., consists of) i) one instance of the sync pattern 508 and ii) M-1 segments that consist of any suitable combination of a) zero, one, or more instances of the sync pattern 508 and b) zero, one, or more instances of the complement of the sync pattern 508.

In another embodiment, the WUR sync field 550 of the advanced mode WUR packet includes (e.g., consists of) a single sync portion having the sync pattern 508, whereas the WUR sync field 500 of the base mode WUR packet includes (e.g., consists of) two instances of the sync pattern 508. In another embodiment, the WUR sync field 550 of the advanced mode WUR packet includes (e.g., consists of) a single sync portion having the sync pattern 508, whereas the WUR sync field 500 of the base mode WUR packet includes (e.g., consists of) M instances of the sync pattern 508.

Referring now to FIGS. 1D, 5A, and 5B, the LP-WUR 150 is configured to detect sync pattern 508 and the complement of the sync pattern 508 in WUR packets, according to an embodiment. When the LP-WUR 150 detects two (or M) instances of the sync pattern 508 in a WUR packet, the LP-WUR 150 processes the WUR packet according to a format of the base mode WUR packet; and when the LP-WUR 150 detects the complement of the sync pattern 508 in a WUR packet, the LP-WUR 150 processes the WUR packet according to a format of the advanced mode WUR packet. In some embodiments in which base mode WUR packets are transmitted at a first fixed data rate and advanced mode WUR packets are transmitted at a second fixed data rate (which is higher than the first fixed data rate): when the LP-WUR 150 detects two (or M) instances of the sync pattern 508 in a WUR packet, the LP-WUR 150 processes the WUR packet according to the first fixed data rate; and when the LP-WUR 150 detects the complements of the sync pattern 508 in a WUR packet, the LP-WUR 150 processes the WUR packet according to the second fixed data rate.

The digital baseband circuitry 188 is configured to detect the sync pattern 508 and the complement of the sync pattern 508 in WUR packets, according to an embodiment. When the digital baseband circuitry 188 detects two (or M) instances of the sync pattern 508 in a WUR packet, the digital baseband circuitry 188 and/or the logic circuitry 192 processes the WUR packet according to a format of the base mode WUR packet; and when the LP-WUR 150 detects the complement of the sync pattern 508 in a WUR packet, the digital baseband circuitry 188 and/or the logic circuitry 192 processes the WUR packet according to a format of the advanced mode WUR packet. In some embodiments in which base mode WUR packets are transmitted at a first fixed data rate and advanced mode WUR packets are transmitted at a second fixed data rate (which is higher than the first fixed data rate): when the digital baseband circuitry 188 detects two (or M) instances of the sync pattern 508 in a WUR packet, the digital baseband circuitry 188 processes the WUR packet according to the first fixed data rate; and when the digital baseband circuitry 188 detects the complement of the sync pattern 508 in a WUR packet, the digital baseband circuitry 188 processes the WUR packet according to the second fixed data rate.

In an embodiment, when the digital baseband circuitry 188 detects the two (or M) instances of the sync pattern 508 in a WUR packet, the digital baseband circuitry 188 generates a signal that indicates to the logic circuitry 192 that the WUR packet is a base mode WUR packet; and when the LP-WUR 150 detects the complement of the sync pattern 508 in a WUR packet, the digital baseband circuitry 188 generates a signal that indicates to the logic circuitry 192 that WUR packet is an advanced mode WUR packet.

In an embodiment, the digital baseband circuitry 188 includes at least one correlator that cross-correlates the sync pattern 508 (and/or the complement of the sync pattern 508) with a received baseband signal to detect whether the received baseband signal includes the sync pattern 508 or the complement of the sync pattern 508.

In an embodiment, basic LP-WURs are not capable of detecting the complement of the sync pattern 508 and/or assume that all WUR packets are base mode WUR packets; e.g., basic LP-WURs process all detected WUR packets as if they are base mode WUR packets.

Figure 6A:
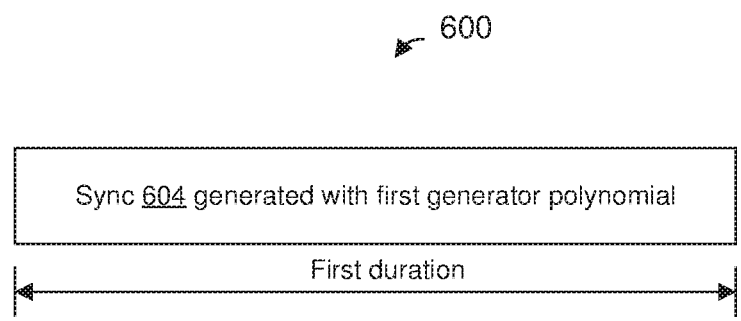
FIG. 6A is a diagram of an example WUR sync field of a WUR packet that is transmitted according to a first PHY transmission mode, according to an embodiment.
Figure 6B:
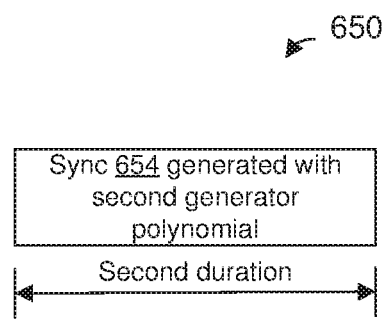
FIG. 6B is a diagram of an example WUR sync field of a WUR packet that is transmitted according to a second PHY transmission mode, according to an embodiment.

FIG. 6A is a diagram of an example WUR sync field 600 of a base mode WUR packet (e.g., the WUR sync field 312 of FIG. 3), and FIG. 6B is a diagram of an example WUR sync field 650 of an advanced mode WUR packet (e.g., the WUR sync field 412 of FIG. 4), according to another embodiment.

The WUR sync field 600 of the base mode WUR packet has a first duration, and the WUR sync field 650 of the advanced mode WUR packet has a second duration that is 1/M of the first duration (i.e., the first duration is M times the second duration). In an embodiment, M is two.

The WUR sync field 600 of the base mode WUR packet includes (e.g., consists of) a sync signal 604 generated with a first generator polynomial, whereas the WUR sync field 650 of the advanced mode WUR packet includes (e.g., consists of) a sync signal 654 generated with a second generator polynomial that is different than the first generator polynomial. The first generator polynomial and the second generator polynomial are selected such that i) the sync signal 604 has good autocorrelation properties, ii) the sync signal 654 has good autocorrelation properties, and iii) the sync signal 604 and the sync signal 608 have good cross-correlation properties, according to an embodiment. Good autocorrelation properties include having a relatively high center lobe as compared to the height of side lobes, according to an embodiment. Good cross correlation properties include having a relatively low cross correlation lobes as compared to the heights of autocorrelation center lobes of the sync signal 604 and the sync signal 608, according to an embodiment.

Referring now to FIGS. 1D, 6A, and 6B, the LP-WUR 150 is configured to detect the sync signal 604 and the sync signal 654 in WUR packets, according to an embodiment. When the LP-WUR 150 detects the sync signal 604 in a WUR packet, the LP-WUR 150 processes the WUR packet according to a format of the base mode WUR packet; and when the LP-WUR 150 detects the sync signal 654 in a WUR packet, the LP-WUR 150 processes the WUR packet according to a format of the advanced mode WUR packet. In some embodiments in which base mode WUR packets are transmitted at a first fixed data rate and advanced mode WUR packets are transmitted at a second fixed data rate (which is higher than the first fixed data rate): when the LP-WUR 150 detects the sync signal 604 in a WUR packet, the LP-WUR 150 processes the WUR packet according to the first fixed data rate; and when the LP-WUR 150 detects the sync signal 654 in a WUR packet, the LP-WUR 150 processes the WUR packet according to the second fixed data rate.

The digital baseband circuitry 188 is configured to detect the sync signal 604 and the sync signal 654 in WUR packets, according to an embodiment. When the digital baseband circuitry 188 detects the sync signal 604 in a WUR packet, the digital baseband circuitry 188 and/or the logic circuitry 192 processes the WUR packet according to a format of the base mode WUR packet; and when the LP-WUR 150 detects the sync signal 654 in a WUR packet, the digital baseband circuitry 188 and/or the logic circuitry 192 processes the WUR packet according to a format of the advanced mode WUR packet. In some embodiments in which base mode WUR packets are transmitted at a first fixed data rate and advanced mode WUR packets are transmitted at a second fixed data rate (which is higher than the first fixed data rate): when the digital baseband circuitry 188 detects the sync signal 604 in a WUR packet, the digital baseband circuitry 188 processes the WUR packet according to the first fixed data rate; and when the digital baseband circuitry 188 detects the sync signal 654 in a WUR packet, the digital baseband circuitry 188 processes the WUR packet according to the second fixed data rate.

In an embodiment, when the digital baseband circuitry 188 detects the sync signal 604 in a WUR packet, the digital baseband circuitry 188 generates a signal that indicates to the logic circuitry 192 that the WUR packet is a base mode WUR packet; and when the LP-WUR 150 detects the sync signal 654 in a WUR packet, the digital baseband circuitry 188 generates a signal that indicates to the logic circuitry 192 that WUR packet is an advanced mode WUR packet.

In an embodiment, the digital baseband circuitry 188 includes i) a first correlator that cross-correlates the sync signal 604 with a received baseband signal to detect whether the received baseband signal includes the sync signal 604, and ii) a second correlator that cross-correlates the sync signal 654 with the received baseband signal to detect whether the received baseband signal includes the sync signal 654.

In an embodiment, basic LP-WURs are not capable of detecting the sync signal 654 and/or assume that all WUR packets are base mode WUR packets; e.g., basic LP-WURs process all detected WUR packets as if they are base mode WUR packets.

Figure 7A:
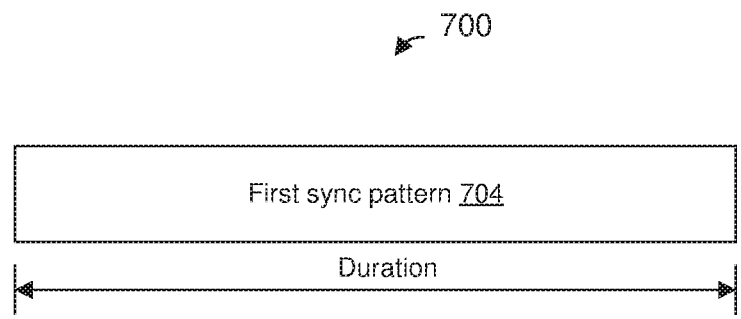
FIG. 7A is a diagram of an example WUR sync field of a WUR packet that is transmitted according to a first PHY transmission mode, according to an embodiment.
Figure 7B:
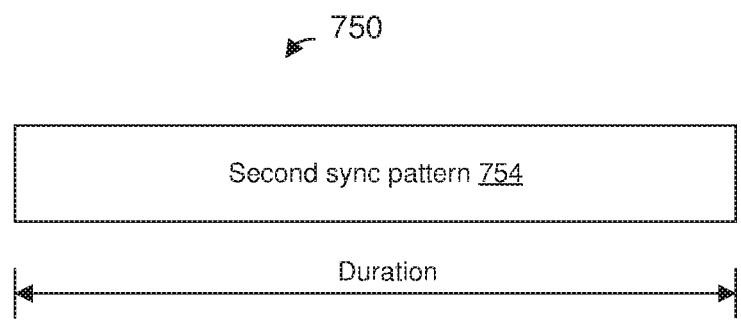
FIG. 7B is a diagram of an example WUR sync field of a WUR packet that is transmitted according to a second PHY transmission mode, according to an embodiment.

FIG. 7A is a diagram of an example WUR sync field 700 of a base mode WUR packet (e.g., the WUR sync field 312 of FIG. 3), and FIG. 7B is a diagram of an example WUR sync field 750 of an advanced mode WUR packet (e.g., the WUR sync field 412 of FIG. 4), according to another embodiment.

The WUR sync field 700 of the base mode WUR packet and the WUR sync field 750 of the advanced mode WUR packet have the same duration.

The WUR sync field 700 of the base mode WUR packet includes (e.g., consists of) a first sync pattern 704, whereas the WUR sync field 750 of the advanced mode WUR packet includes (e.g., consists of) a second sync pattern 754 that is different than the first sync pattern 704. The first sync pattern 704 and the second sync pattern 754 are selected such that i) the first sync pattern 704 has good autocorrelation properties, ii) the second sync pattern 754 has good autocorrelation properties, and iii) the first sync pattern 704 and the second sync pattern 754 have good cross-correlation properties, according to an embodiment. Good autocorrelation properties include having a relatively high center lobe as compared to the height of side lobes, according to an embodiment. The first sync pattern 704 and the second sync pattern 754 having good cross correlation properties includes having a relatively low cross correlation lobes as compared to the heights of autocorrelation center lobes of the first sync pattern 704 and the second sync pattern 754, according to an embodiment.

In an embodiment, the first sync pattern 704 includes (e.g., consists of) a first Golay sequence (Ga), and the second sync pattern 754 includes (e.g., consists of) a second Golay sequence (Gb) that is a complementary Golay sequence of Ga.

In another embodiment, the first sync pattern 704 includes (e.g., consists of) a first maximum length sequence (MLS), and the second sync pattern 754 includes (e.g., consists of) a second MLS. The first MLS and the second MLS are selected such that i) the first MLS has good autocorrelation properties, ii) the second MLS has good autocorrelation properties, and iii) the first MLS and the second MLS have good cross-correlation properties, according to an embodiment.

In another embodiment, the first sync pattern 704 includes (e.g., consists a first Gold sequence, and the second sync pattern 754 includes (e.g., consists of) a second Gold sequence, wherein the first Gold sequence and the second Gold sequence are selected from a set of Gold sequences.

In another embodiment, the second sync pattern 754 includes (e.g., consists of) a complement of the first sync pattern 704.

In another embodiment, the first sync pattern 704 includes (e.g., consists of) i) a base sequence, and ii) a first delimiter symbol following the base sequence; and the second sync pattern 754 includes (e.g., consists of) i) the base sequence, and ii) a second delimiter symbol following the base sequence, wherein the second delimiter symbol is different than the first delimiter symbol. In an illustrative embodiment, OOK modulation is used, where "O" denotes "on", "F" denotes "off", and "M" denotes "on" phase shifted by 180 degrees (sometimes referred to as the "minus" of O); the first sync pattern 704 consists of the sequence "OOOOOF", where F is the first delimiter symbol, the second sync pattern 754 consists of the sequence "OOOOOM", where M is the first delimiter symbol, and where "OOOOO" is the base sequence. In other embodiments, other suitable base sequences are used and/or other suitable pairs of delimiter symbols are used.

Referring now to FIGS. 1D, 7A, and 7B, the LP-WUR 150 is configured to detect the sync pattern 704 and the sync pattern 754 in WUR packets, according to an embodiment. When the LP-WUR 150 detects the sync pattern 701 in a WUR packet, the LP-WUR 150 processes the WUR packet according to a format of the base mode WUR packet; and when the LP-WUR 150 detects the sync pattern 754 in a WUR packet, the LP-WUR 150 processes the WUR packet according to a format of the advanced mode WUR packet. In some embodiments in which base mode WUR packets are transmitted at a first fixed data rate and advanced mode WUR packets are transmitted at a second fixed data rate (which is higher than the first fixed data rate): when the LP-WUR 150 detects the sync pattern 704 in a WUR packet, the LP-WUR 150 processes the WUR packet according to the first fixed data rate; and when the LP-WUR 150 detects the sync pattern 754 in a WUR packet, the LP-WUR 150 processes the WUR packet according to the second fixed data rate.

The digital baseband circuitry 188 is configured to detect the sync pattern 704 and the sync pattern 754 in WUR packets, according to an embodiment. When the digital baseband circuitry 188 detects the sync pattern 704 in a WUR packet, the digital baseband circuitry 188 and/or the logic circuitry 192 processes the WUR packet according to a format of the base mode WUR packet; and when the LP-WUR 150 detects the sync pattern 754 in a WUR packet, the digital baseband circuitry 188 and/or the logic circuitry 192 processes the WUR packet according to a format of the advanced mode WUR packet. In some embodiments in which base mode WUR packets are transmitted at a first fixed data rate and advanced mode WUR packets are transmitted at a second fixed data rate (which is higher than the first fixed data rate): when the digital baseband circuitry 188 detects the sync pattern 704 in a WUR packet, the digital baseband circuitry 188 processes the WUR packet according to the first fixed data rate; and when the digital baseband circuitry 188 detects the sync pattern 754 in a WUR packet, the digital baseband circuitry 188 processes the WUR packet according to the second fixed data rate.

In an embodiment, when the digital baseband circuitry 188 detects the sync pattern 704 in a WUR packet, the digital baseband circuitry 188 generates a signal that indicates to the logic circuitry 192 that the WUR packet is a base mode WUR packet; and when the LP-WUR 150 detects the sync pattern 754 in a WUR packet, the digital baseband circuitry 188 generates a signal that indicates to the logic circuitry 192 that WUR packet is an advanced mode WUR packet.

In an embodiment, the digital baseband circuitry 188 includes at least one correlator that cross-correlates the sync pattern 704 (and/or the sync pattern 754) with a received baseband signal to detect whether the received baseband signal includes the sync pattern 704 or the sync pattern 754.

In an embodiment, basic LP-WURs are not capable of detecting the sync pattern 754 and/or assume that all WUR packets are base mode WUR packets; e.g., basic LP-WURs process all detected WUR packets as if they are base mode WUR packets.

Figure 8A:
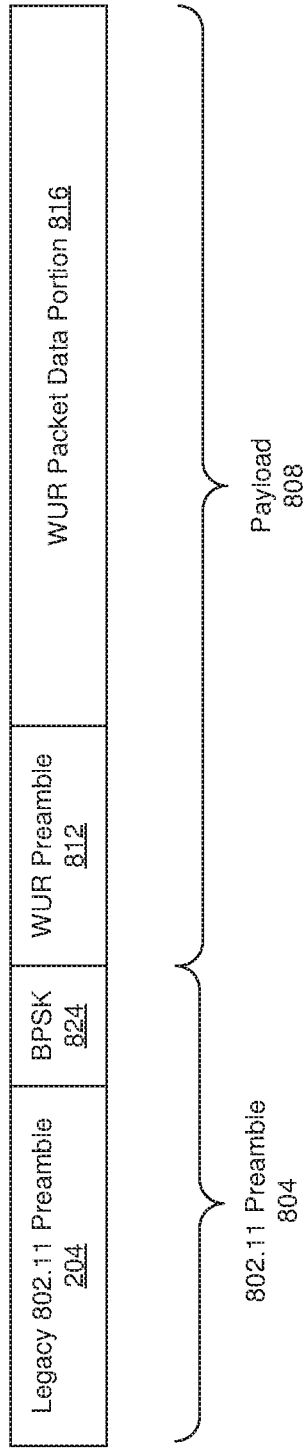
FIG. 8A is a diagram of an example WUR packet that is transmitted according to a first PHY transmission mode, according to an embodiment.
Figure 8B:
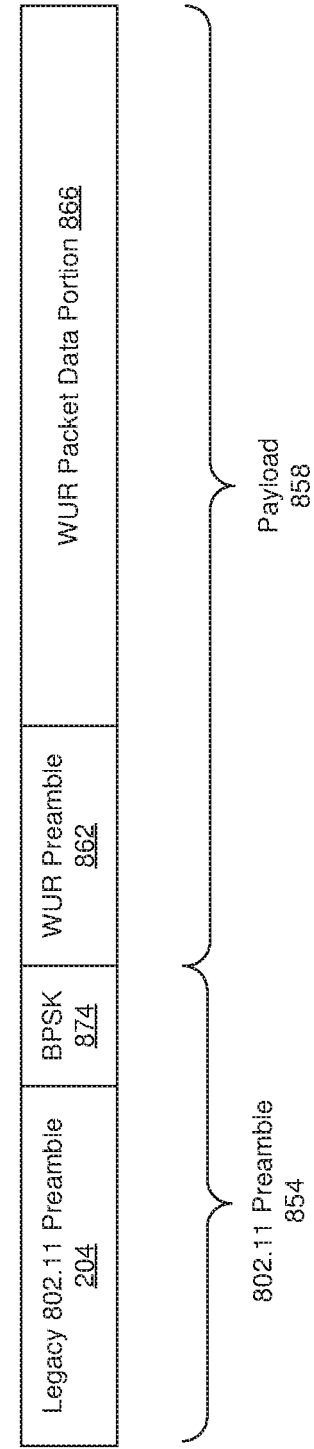
FIG. 8B is a diagram of an example WUR packet that is transmitted according to a second PHY transmission mode, according to an embodiment.

Referring again to FIG. 2, in some embodiments, the sync field in WUR preamble 228 is the same for both base mode WUR packets and advanced mode WUR packets; and the OFDM symbol 224 is used to signal whether a WUR packet is a base mode WUR packet or an advanced mode WUR packet. FIG. 8A is a diagram of an example base mode WUR packet 800, and FIG. 8B is a diagram of an example advanced mode WUR packet 850, according to another embodiment.

The base mode WUR packet 800 includes an IEEE 802.11 preamble portion 804 and a payload portion 808. The payload portion 808 includes a WUR preamble 812 and a WUR packet data portion 816. The WUR preamble 812 includes a sync pattern.

The IEEE 802.11 preamble portion 804 includes the legacy 802.11 preamble 204 (FIG. 2) and an OFDM symbol 824 with BPSK modulated subcarriers. In an embodiment, the BPSK modulated subcarriers of the OFDM symbol 824 form a first pattern that indicates that that the WUR packet 800 is a base mode WUR packet.

The base mode WUR packet 850 includes an IEEE 802.11 preamble portion 854 and a payload portion 858. The payload portion 858 includes a WUR preamble 862 and a WUR packet data portion 866. The WUR preamble 862 includes the same sync pattern as the WUR preamble 812 of the base mode WUR packet 800, according to an embodiment.

The IEEE 802.11 preamble portion 854 includes the legacy 802.11 preamble 204 (FIG. 2) and an OFDM symbol 874 with BPSK modulated subcarriers. In an embodiment, the BPSK modulated subcarriers of the OFDM symbol 874 form a second pattern that indicates that that the WUR packet 850 is an advanced mode WUR packet, i.e., the second pattern is different than the first pattern.

Referring now to FIGS. 1D, 8A, and 8B, the LP-WUR 150 is configured to detect the OFDM symbol 824 and the OFDM symbol 874 in WUR packets, according to an embodiment. When the LP-WUR 150 detects the OFDM symbol 824 in a WUR packet, the LP-WUR 150 processes the WUR packet according to a format of the base mode WUR packet; and when the LP-WUR 150 detects the OFDM symbol 874 in a WUR packet, the LP-WUR 150 processes the WUR packet according to a format of the advanced mode WUR packet. In some embodiments in which base mode WUR packets are transmitted at a first fixed data rate and advanced mode WUR packets are transmitted at a second fixed data rate (which is higher than the first fixed data rate): when the LP-WUR 150 detects the OFDM symbol 824 in a WUR packet, the LP-WUR 150 processes the WUR packet according to the first fixed data rate; and when the LP-WUR 150 detects the OFDM symbol 874 in a WUR packet, the LP-WUR 150 processes the WUR packet according to the second fixed data rate.

The digital baseband circuitry 188 is configured to detect to the OFDM symbol 824 and the OFDM symbol 874 in WUR packets, according to an embodiment. When the digital baseband circuitry 188 detects the OFDM symbol 824 in a WUR packet, the digital baseband circuitry 188 and/or the logic circuitry 192 processes the WUR packet according to a format of the base mode WUR packet; and when the LP-WUR 150 detects the OFDM symbol 874 in a WUR packet, the digital baseband circuitry 188 and/or the logic circuitry 192 processes the WUR packet according to a format of the advanced mode WUR packet. In some embodiments in which base mode WUR packets are transmitted at a first fixed data rate and advanced mode WUR packets are transmitted at a second fixed data rate (which is higher than the first fixed data rate): when the digital baseband circuitry 188 detects the OFDM symbol 824 in a WUR packet, the digital baseband circuitry 188 processes the WUR packet according to the first fixed data rate; and when the digital baseband circuitry 188 detects the OFDM symbol 874 in a WUR packet, the digital baseband circuitry 188 processes the WUR packet according to the second fixed data rate.

In an embodiment, when the digital baseband circuitry 188 detects the OFDM symbol 824 in a WUR packet, the digital baseband circuitry 188 generates a signal that indicates to the logic circuitry 192 that the WUR packet is a base mode WUR packet; and when the LP-WUR 150 detects the OFDM symbol 874 in a WUR packet, the digital baseband circuitry 188 generates a signal that indicates to the logic circuitry 192 that WUR packet is an advanced mode WUR packet.

In an embodiment, the digital baseband circuitry 188 includes at least one correlator that cross-correlates a pattern in the OFDM symbol 824 (and/or a pattern in the OFDM symbol 874) with a received baseband signal to detect whether the received baseband signal includes the OFDM symbol 824 or the OFDM symbol 824.

In an embodiment, basic LP-WURs are not capable of detecting the sync pattern 754 and/or assume that all WUR packets are base mode WUR packets; e.g., basic LP-WURs process all detected WUR packets as if they are base mode WUR packets.

Figure 9:
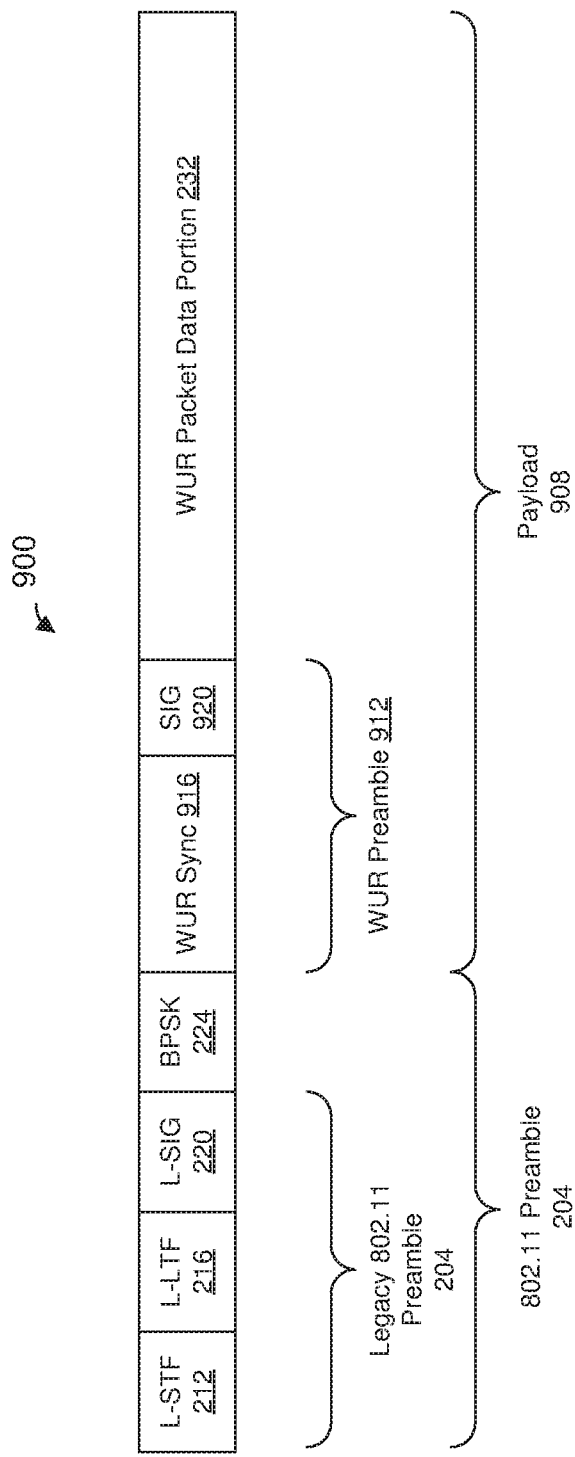
FIG. 9 is a diagram of another example WUR packet, according to another embodiment.

Referring again to FIGS. 2-4, 8A, and 8B, in some embodiments the WUR preamble 228/304/404/812/862 of a WUR packet includes a WUR signal (SIG) field in addition to the WUR sync field. FIG. 9 is a diagram of an example WUR packet 900, which is a base mode WUR or an advanced mode WUR packet, according to various embodiments. The WUR packet 900 is similar to the WUR packet 200 of FIG. 2, and like-numbered elements are not described in detail for purposes of brevity.

The WUR packet 900 includes a WUR payload portion 908. The WUR payload portion 908 includes a WUR preamble 912 having a WUR sync field 916 and a WUR SIG field 920. The WUR SIG field 920 indicates one or more PHY parameters corresponding to the WUR packet data portion 232. For example, if the WUR packet data portion 232 is permitted to be transmitted at one of a plurality of different data rates, the WUR SIG field 920 indicates the data rate. As another example, if the WUR packet data portion 232 is permitted to be modulated using one of a plurality of different modulation schemes, the WUR SIG field 920 indicates the modulation scheme. As another example, if the WUR packet data portion 232 is permitted to be encoded using one of a plurality of different encoding schemes, the WUR SIG field 920 indicates the encoding scheme. As another example, if the WUR packet data portion 232 is permitted to have a variable length, the WUR SIG field 920 indicates the length of the WUR packet data portion 232.

In an embodiment, base mode WUR packets do not include the WUR SIG field 920, whereas advanced mode WUR packets include the WUR SIG field 920.

Referring again to FIGS. 2-4, 8A, 8B, and 9, in some embodiments the WUR packet data portion 232/308/408 of a WUR packet includes a header field that indicates one or more parameters corresponding to the WUR packet data portion 232/308/408. For example, if the WUR packet data portion 232/308/408 is permitted to be encoded using one of a plurality of different encoding schemes, the header field indicates the encoding scheme. As another example, if the WUR packet data portion 232/308/408 is permitted to include different types of data (e.g., a wakeup packet, configuration data, control data, etc.), the header field indicates the type of data included in the WUR packet data portion 232/308/408. As another example, if the WUR packet data portion 232 is permitted to have a variable length, the header field indicates the length of the WUR packet data portion 232.

In an embodiment, base mode WUR packets do not include the header field, whereas advanced mode WUR packets include the header field.

In some embodiments, base mode WUR packets are transmitted at a first fixed data rate, and advanced mode WUR packets are transmitted at a second fixed data rate that is higher than the first fixed data rate. Thus, in some embodiments, the base mode WUR packets may be referred to as low data rate WUR packets, and advanced mode WUR packets may be referred to as high data rate WUR packets; and the base mode WUR packets may be referred to as low data rate WUR packets, and advanced mode WUR packets may be referred to as high data rate WUR packets.

In other embodiments, however, advanced mode WUR packets are permitted to be transmitted at a plurality of different data rates. In some embodiments, the plurality of data rates includes the fixed data rate of base mode WUR packets. In other embodiments, the plurality of data rates consists of multiple data rates that are higher than the fixed data rate of base mode WUR packets.

Referring again to FIG. 1A, the wireless network 110 may include both i) one or more client stations 134 with basic LP-WURs, and ii) one or more client stations 134 with advanced LP-WURs. The wireless network interface device 142 of the client station 134-1 is configured to generate and transmit to the AP 114 a WLAN packet that includes WUR capability information. In various embodiments, the WUR capability information includes one or more of i) information that indicates whether the client station 134 includes an LP-WUR 150, ii) information that indicates whether the LP-WUR 150 of the client station 134 is a basic LP-WUR, iii) information that indicates whether the LP-WUR 150 of the client station 134 is an advanced LP-WUR, iv) information that indicates whether the LP-WUR 150 of the client station 134 is capable of receiving advanced mode WUR packets, etc.

In various embodiments, the wireless network interface device 142 of the client station 134-1 is configured to include the WUR capability information in WLAN frames such as association request frames, reassociation request frames, and/or other types of frames suitable for transmitting capability information.

The wireless network interface device 122 of the AP 114 is configured to determine whether each client station 134 can correctly process an advanced mode WUR packet using WUR capability information received from the client station 134. When WUR capability information from the client station 134 indicates that the client station 134 cannot correctly process advanced mode WUR packets, the wireless network interface device 122 of the AP 114 is configured to transmit only base mode WUR packets to the client station 134, according to an embodiment. When WUR capability information from the client station 134 indicates that the client station 134 can correctly process advanced mode WUR packets, the wireless network interface device 122 of the AP 114 is configured to transmit advanced mode WUR packets to the client station 134 at least in some situations, according to an embodiment.

When WUR capability information from the client stations 134 indicates that at least one of the client stations 134 cannot correctly process advanced mode WUR packets, the wireless network interface device 122 of the AP 114 is configured to transmit only base mode WUR packets having a broadcast address, according to an embodiment. When WUR capability information from the client stations 134 indicates that all of the client stations 134 can correctly process advanced mode WUR packets, the wireless network interface device 122 of the AP 114 is configured to transmit advanced mode WUR packets having a broadcast address at least in some situations, according to an embodiment.

When WUR capability information from a group of client stations 134 indicates that at least one of the client stations 134 in the group cannot correctly process advanced mode WUR packets, the wireless network interface device 122 of the AP 114 is configured to transmit only base mode WUR packets having a group address (e.g., a multicast address) corresponding to the group of client stations 134, according to an embodiment. When WUR capability information from a group of client stations 134 indicates that all of the client stations 134 in the group can correctly process advanced mode WUR packets, the wireless network interface device 122 of the AP 114 is configured to transmit advanced mode WUR packets having a group address (e.g., a multicast address) corresponding to the group of client stations 134 at least in some situations, according to an embodiment.

The wireless network interface device 122 of the AP 111 is configured to operate in different modes related to WUR packet transmission. For example, in an embodiment, the wireless network interface device 122 of the AP 114 is configured to operate in a plurality of modes that includes: i) a first mode (referred to herein as "base only mode") in which the wireless network interface device 122 of the AP 114 is configured to transmit only base mode WUR packets; or ii) a second mode (referred to herein as "hybrid mode") in which the wireless network interface device 122 of the AP 114 is configured to transmit both base mode WUR packets and advanced mode WUR packets. In an embodiment, the plurality of modes also includes i) a third mode (referred to herein as "advanced only mode") in which the wireless network interface device 122 of the AP 114 is configured to transmit only advanced mode WUR packets.

The wireless network interface device 122 of the AP 114 is configured to generate and transmit to the client stations 134 WLAN packets that include WUR capability and/or mode information. In various embodiments, the WUR capability and/or mode information includes information that indicates which one of a plurality of different modes related to WUR packet transmission in which the wireless network interface device 122 of the AP 114 is operating. For example, the WUR capability and/or mode information includes information that indicates whether the wireless network interface device 122 of the AP 114 is operating in i) the base only mode, or ii) the hybrid mode, according to an embodiment. As another example, the WUR capability and/or mode information includes information that indicates whether the wireless network interface device 122 of the AP 114 is operating in i) the base only mode, ii) the hybrid mode, or iii) the advanced only mode, according to an embodiment.

In various embodiments, the wireless network interface device 122 of the AP 114 is configured to include the WUR capability and/or mode information in WLAN frames such as beacon frames, association response frames, reassociation response frames, and/or other types of frames suitable for transmitting capability and/or mode information.

Figure 10:
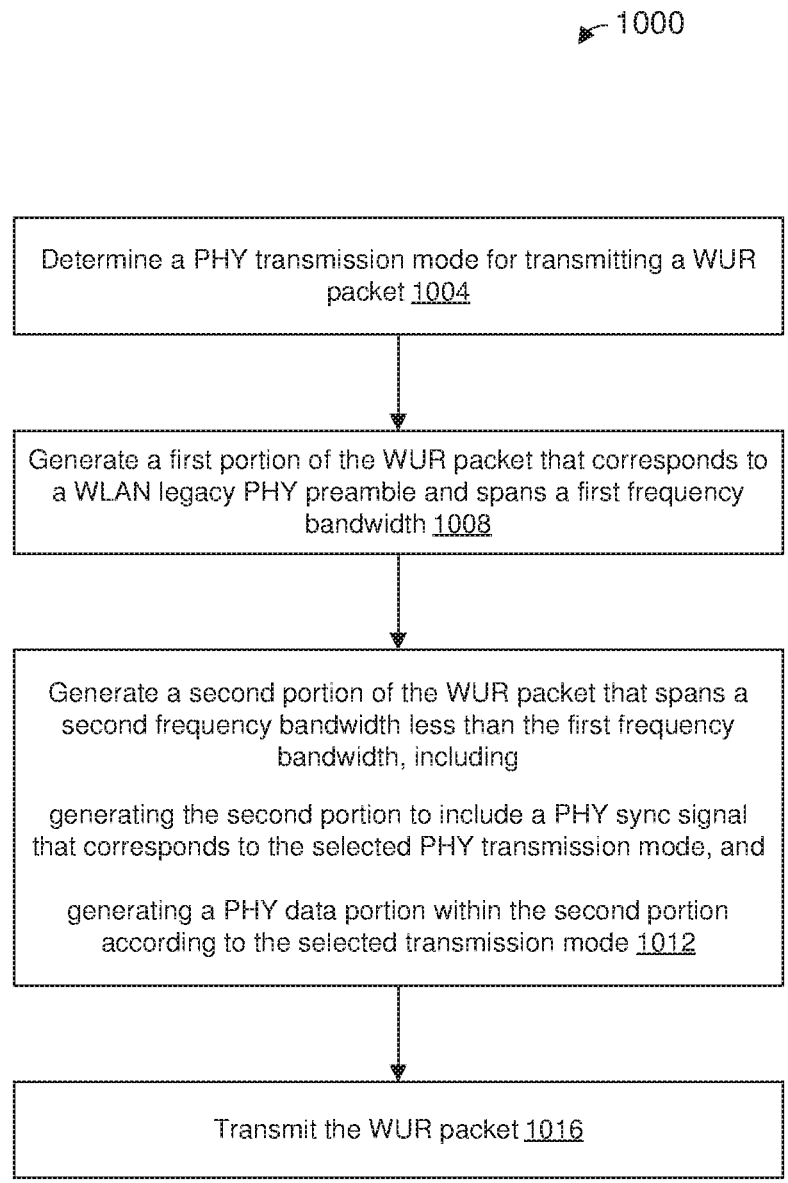
FIG. 10 is a flow diagram of an example method for transmitting a WUR packet, according to an embodiment.

FIG. 10 is a flow diagram of an example method 1000, performed by a first communication device, for transmitting a WUR packet to a WUR of a second communication device, according to an embodiment. In an embodiment, the second communication device includes a separate WLAN network interface device coupled to the WUR.

In an embodiment, the first communication device is the AP 114 and the second communication device is the client station 134-1. In other embodiments, however, the first communication device and the second communication device are other suitable communication devices. In an embodiment, the network interface device 122 of the AP 114 is configured to perform the method 1000. In other embodiments, however, the method 1000 is performed by another suitable communication device.

At block 1004, the first communication device determines a PHY transmission mode for transmitting the WUR packet. In an embodiment, the determined PHY transmission mode is selected from a plurality of different PHY transmission modes. In an embodiment, the plurality of different PHY transmission modes includes a first PHY transmission mode corresponding to transmitting base mode WUR packets and a second PHY transmission mode corresponding to transmitting advanced mode WUR packets. In an embodiment, the plurality of different PHY transmission modes includes transmitting at a first fixed data rate and transmitting at a second fixed data rate that is higher than the first fixed data rate. In an embodiment, the plurality of different PHY transmission modes includes transmitting at a first fixed data rate and transmitting at a second data rate that is selected from a plurality of different data rates. In an embodiment, the plurality of different PHY transmission modes includes a first PHY transmission mode that corresponds to a fixed duration of the WUR packet, and a second PHY transmission mode that corresponds to a variable duration of the WUR packet.

At block 1008, the first communication device generates a first portion of the WUR packet. In an embodiment, the first portion of the WUR packet corresponds to a WLAN legacy PHY preamble of the WUR packet. In an embodiment, the first portion of the WUR packet spans a first frequency bandwidth. In some embodiments, the first portion of the packet corresponds to the IEEE 802.11 preamble portion 204 (FIGS. 2, 9), the IEEE 802.11 preamble portion 804 (FIG. 8A), or the IEEE 802.11 preamble portion 854 (FIG. 8B).

At block 1012, the first communication device generates a second portion of the WUR packet. In an embodiment, the second portion of the WUR packet is generated to span a second frequency bandwidth that is less than the first frequency bandwidth. Generating the second portion of the WUR packet includes: generating the second portion of the WUR packet to include a PHY sync signal that corresponds to the selected PHY transmission mode, and generating a PHY data portion, within the second portion of the WUR packet, according to the selected transmission mode. In an embodiment, the PHY sync signal is selected from a plurality of different PHY sync signals that respectively correspond to the plurality of different PHY transmission modes.

In an embodiment, the plurality of PHY transmission modes includes a first PHY transmission mode and a second PHY transmission mode; and the plurality of different PHY sync signals includes a first PHY sync signal corresponding to the first PHY transmission mode, and a second PHY sync signal corresponding to the second PHY transmission mode; when the determined PHY transmission mode is the first PHY transmission mode, generating the second portion of the WUR packet includes: generating the second portion of the WUR packet to include the first PHY sync signal, and generating the PHY data portion according to the first PHY transmission mode; and when the determined PHY transmission mode is the second PHY transmission mode, generating the second portion of the WUR packet includes: generating the second portion of the WUR packet to include the second PHY sync signal, and generating the PHY data portion according to the second PHY transmission mode.

In an embodiment, the first PHY transmission mode corresponds to a first data rate; the second PHY transmission mode corresponds to a second data rate that is higher than the first data rate; when the determined PHY transmission mode is the first PHY transmission mode, generating the second portion of the WUR packet includes: generating the PHY data portion according to the first data rate; and when the determined PHY transmission mode is the second PHY transmission mode, generating the second portion of the WUR packet includes: generating the PHY data portion according to the second data rate.

In an embodiment, the first PHY sync signal has a first duration; and the second PHY sync signal has a second duration that is shorter than the first duration.

In an embodiment, the first PHY sync signal includes a sync pattern and a repetition of the sync pattern; and the second PHY sync signal includes a complement of the sync pattern.

In an embodiment, the first PHY transmission mode corresponds to a fixed duration of the PHY data portion; the second PHY transmission mode corresponds to a variable duration of the PHY data portion; when the determined PHY transmission mode is the first PHY transmission mode, generating the second portion of the WUR packet includes: generating the PHY data portion to have the fixed duration; and when the determined PHY transmission mode is the second PHY transmission mode, generating the second portion of the WUR packet includes: generating the PHY data portion to have a duration that is different than the fixed duration.

In an embodiment, generating the second portion of the WUR packet further includes: generating the PHY data portion to include an indication of the duration that is different than the fixed duration.

In various embodiments, the plurality of different PHY sync signals correspond to one or more of the sync patterns and/or sync signals discussed above with reference to FIGS. 2-4, 5A-B, 6A-B, and 7A-B.

Figure 11:
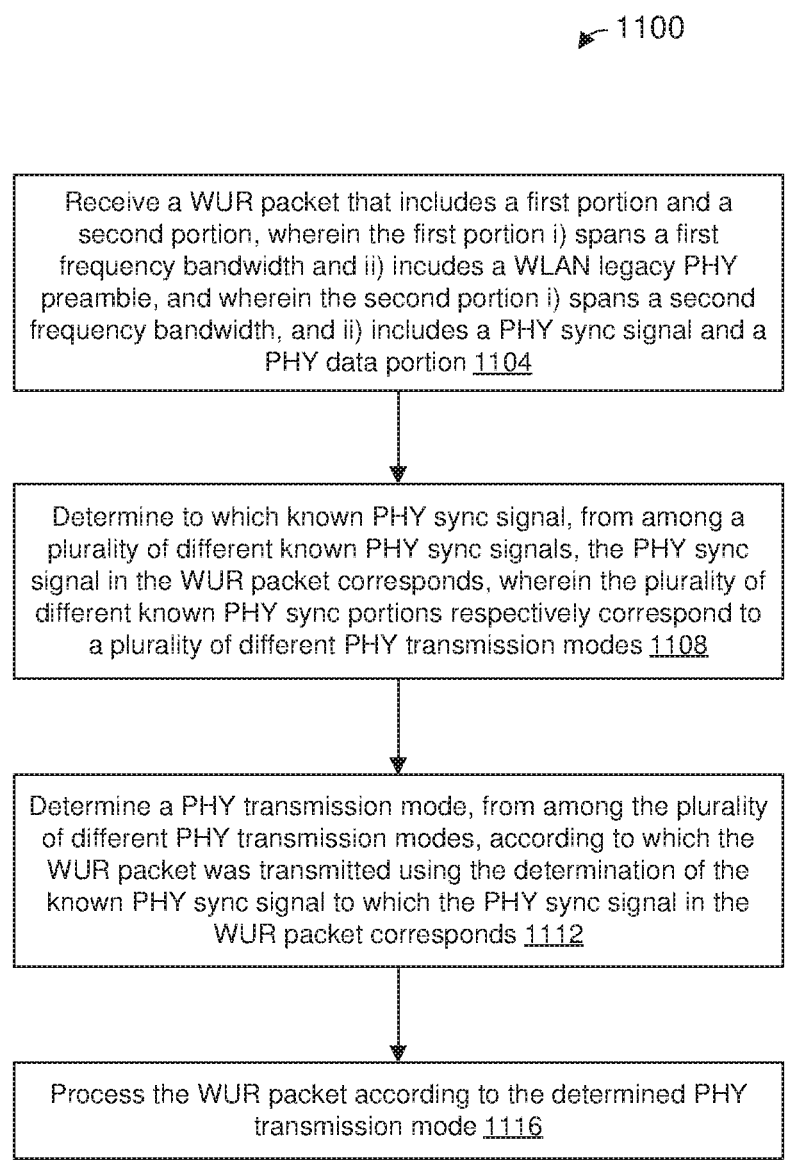
FIG. 11 is a flow diagram of an example method for processing a WUR packet, according to an embodiment.

FIG. 11 is a flow diagram of an example method 1100, performed by a WUR, for processing a WUR packet, according to an embodiment. In an embodiment, the WUR is coupled to a separate WLAN network interface device. In an embodiment, the WUR and the WLAN network interface device are included in a communication device.

In an embodiment, the communication device is the client station 134-1, the WUR is the LP-WUR 150, and the WLAN network interface device is the WLAN network interface device 142. In other embodiments, however, the communication device is another suitable communication device. In an embodiment, the LP-WUR 150 is configured to perform the method 1100. In other embodiments, however, the method 1100 is performed by another suitable communication device.

At block 1104, the WUR receives a WUR packet. In an embodiment, the WUR packet includes: i) a first portion that a) spans a first frequency bandwidth, and b) includes a WLAN legacy PHY preamble, and ii) a second portion that a) spans a second frequency bandwidth that is less than the first frequency bandwidth, and b) includes a PHY sync signal and a PHY data portion.

At block 1108, the WUR determines to which known PHY sync signal, from among a plurality of different known PHY sync signals, the PHY sync signal in the WUR packet corresponds. In an embodiment, the plurality of different known PHY sync portions respectively correspond to a plurality of different PHY transmission modes.

In various embodiments, the plurality of different PHY sync signals correspond to one or more of the sync patterns and/or sync signals discussed above with reference to FIGS. 2-4, 5A-B, 6A-B, and 7A-B.

In an embodiment, the plurality of different PHY transmission modes includes a first PHY transmission mode corresponding to transmitting base mode WUR packets and a second PHY transmission mode corresponding to transmitting advanced mode WUR packets. In an embodiment, the plurality of different PHY transmission modes includes transmitting at a first fixed data rate and transmitting at a second fixed data rate that is higher than the first fixed data rate. In an embodiment, the plurality of different PHY transmission modes includes transmitting at a first fixed data rate and transmitting at a second data rate that is selected from a plurality of different data rates. In an embodiment, the plurality of different PHY transmission modes includes a first PHY transmission mode that corresponds to a fixed duration of the WUR packet, and a second PHY transmission mode that corresponds to a variable duration of the WUR packet.

At block 1112, the WUR determines a PHY transmission mode, from among the plurality of different PHY transmission modes, according to which the WUR packet was transmitted using the determination of the known PHY sync signal to which the PHY sync signal in the WUR packet corresponds.

At block 1116, the WUR processes the PHY data portion according to the determined PHY transmission mode.

In an embodiment, the plurality of different PHY transmission modes includes a first PHY transmission mode and a second PHY transmission mode; the plurality of different known PHY sync signals includes a first known PHY sync signal corresponding to the first PHY transmission mode, and a second known PHY sync signal corresponding to the second PHY transmission mode; when the WUR determines that the PHY sync signal in the WUR packet corresponds to the first known PHY sync signal: determining that the WUR packet was transmitted according to the first PHY transmission mode, and processing the PHY data portion according to the first PHY transmission mode; and when the WUR determines that the PHY sync signal in the WUR packet corresponds to the second known PHY sync signal: determining that the WUR packet was transmitted according to the second PHY transmission mode, and processing the PHY data portion according to the second PHY transmission mode.

In an embodiment, the first PHY transmission mode corresponds to a first data rate; the second PHY transmission mode corresponds to a second data rate that is higher than the first data rate; when the WUR determines that the WUR packet was transmitted according to the first PHY transmission mode: processing the PHY data portion according to the first data rate; and when the WUR determines that the WUR packet was transmitted according to the second PHY transmission mode: processing the PHY data portion according to the second data rate.

In an embodiment, the first known PHY sync signal has a first duration; and the second known PHY sync signal has a second duration that is shorter than the first duration.

In an embodiment, the first PHY sync signal includes a sync pattern and a repetition of the sync pattern; the second PHY sync signal includes a complement of the sync pattern; and determining to which known PHY sync signal the PHY sync signal in the WUR packet corresponds comprises: determining whether the PHY sync signal in the WUR packet includes the sync pattern, and determining whether the PHY sync signal in the WUR packet includes the complement of the sync pattern.

In an embodiment, the first PHY transmission mode corresponds to a fixed duration of the PHY data portion; the second PHY transmission mode corresponds to a variable duration of the PHY data portion; when the determined PHY transmission mode is the first PHY transmission mode, generating the second portion of the WUR packet includes: processing the PHY data portion according to the fixed duration; and when the determined PHY transmission mode is the second PHY transmission mode, generating the second portion of the WUR packet includes: generating the PHY data portion to have a duration that is different than the fixed duration.

In an embodiment, generating the second portion of the WUR packet further includes: generating the PHY data portion to include an indication of the duration that is different than the fixed duration.

Figure 12:
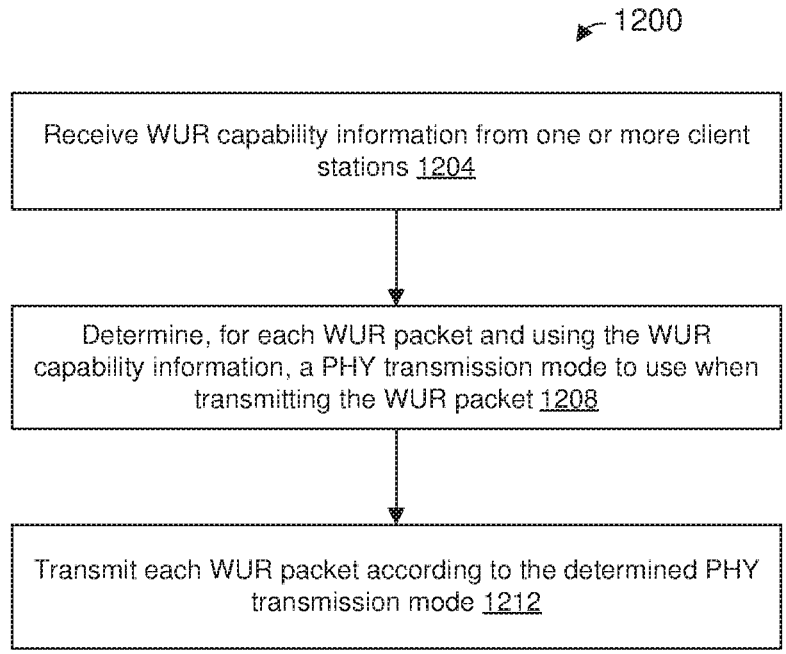
FIG. 12 is a flow diagram of an example method for determining PHY transmission modes for transmitting WUR packets, according to an embodiment.

FIG. 12 is a flow diagram of an example method 1200, performed by a first communication device, for transmitting WUR packets to one or more WURs of one or more respective second communication device, according to an embodiment, in an embodiment, each one or more second communication device includes a respective separate WLAN network interface device coupled to the respective WUR.

In an embodiment, the first communication device is the AP 114 and the one or more second communication devices are one or more client stations 134. In other embodiments, however, the first communication device and the second communication device(s) are other suitable communication devices. In an embodiment, the network interface device 122 of the AP 114 is configured to perform the method 1200. Merely for illustrative purposes, the method 1200 is discussed in the context of the first communication device being the AP 114 and the second communication device(s) being client station 134. In other embodiments, however, the method 1200 is performed by/with other suitable communication devices.

At block 1204, the wireless network interface 122 receives WUR capability information from one or more client stations 134. In an embodiment, the WUR capability information is received in one or more WLAN packets transmitted by one or more respective WLAN network interface devices in the one or more client stations 134.

In various embodiments, the WUR capability information from a particular client station 134 includes one or more of i) information that indicates whether the client station 134 includes an LP-WUR 150, ii) information that indicates whether the LP-WUR 150 of the client station 134 is a basic LP-WUR, iii) information that indicates whether the LP-WUR 150 of the client station 134 is an advanced LP-WUR, iv) information that indicates whether the LP-WUR 150 of the client station 134 is capable of receiving advanced mode WUR packets, etc.

At block 1208, the wireless network interface 122 determines, for each WUR packet to be transmitted and using the WUR capability information received at block 1204, a PHY transmission mode to use when transmitting the WUR packet.

In an embodiment, block 1208 includes determining whether each client station 134 in the network 110 can correctly process an advanced mode WUR packet using WUR capability information received from the client station 134. When WUR capability information from the client station 134 indicates that the client station 134 cannot correctly process advanced mode WUR packets, the wireless network interface device 122 of the AP 114 is configured to determine that only base mode WUR packets will be transmitted to the client station 134, according to an embodiment. When WUR capability information from the client station 134 indicates that the client station 134 can correctly process advanced mode WUR packets, the wireless network interface device 122 of the AP 114 is configured to determine that advanced mode WUR packets will be transmitted to the client station 134 at least in some situations, according to an embodiment.

When WUR capability information from the client stations 134 indicates that at least one of the client stations 134 cannot correctly process advanced mode WUR packets, the wireless network interface device 122 of the AP 114 is configured to determine that all WUR packets having a broadcast address will be transmitted as base mode WUR packets, according to an embodiment. When WUR capability information from the client stations 134 indicates that all of the client stations 134 can correctly process advanced mode WUR packets, the wireless network interface device 122 of the AP 114 is configured to determine that advanced mode WUR packets having a broadcast address can be transmitted at least in some situations, according to an embodiment.

When WUR capability information from a group of client stations 134 indicates that at least one of the client stations 134 in the group cannot correctly process advanced mode WUR packets, the wireless network interface device 122 of the AP 114 is configured to determine that WUR packets having a group address (e.g., a multicast address) corresponding to the group of client stations 134 will be transmitted as base mode WUR packets, according to an embodiment. When WUR capability information from a group of client stations 134 indicates that all of the client stations 134 in the group can correctly process advanced mode WUR packets, the wireless network interface device 122 of the AP 114 is configured to determine that advanced mode WUR packets having a group address (e.g., a multicast address) corresponding to the group of client stations 134 can be transmitted at least in some situations, according to an embodiment.

At block 1212, the wireless network interface 122 transmits each WUR packet according to the PHY transmission mode determined at block 1208.

Figure 13:
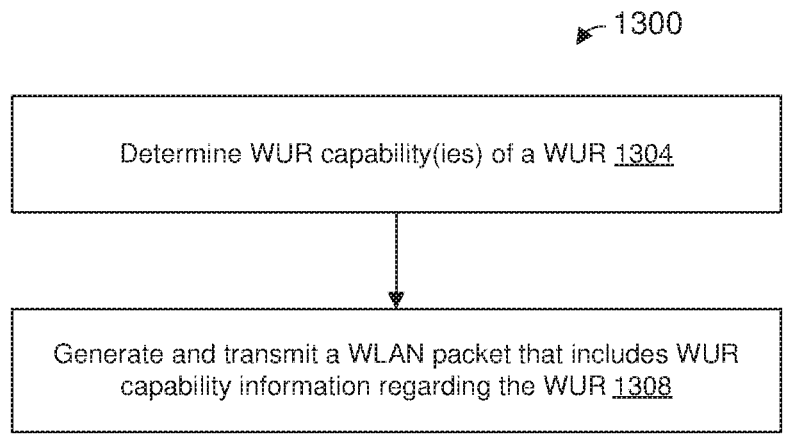
FIG. 13 is a flow diagram of an example method for providing capability information for a WUR, according to an embodiment.

FIG. 13 is a flow diagram of an example method 1300, performed by a first communication device, for transmitting WUR capability information to a second communication device, according to an embodiment. In an embodiment, the first communication device includes a WLAN network interface device coupled to a WUR.

In an embodiment, the first communication device is the client station 134 and the second communication device is the AP 114. In other embodiments, however, the first communication device and the second communication device(s) are other suitable communication devices. In an embodiment, the network interface device 142 of the client station 134 is configured to perform the method 1300. Merely for illustrative purposes, the method 1300 is discussed in the context of the first communication device being the client station 134 and the second communication device being the AP 114. In other embodiments, however, the method 1300 is performed by/with other suitable communication devices.

At block 1304, the network interface device 142 determines one or more WUR capabilities of the LP-WUR 150. In an embodiment, block 1304 includes retrieving capability information from a memory coupled to, or included in, the network interface device 142. In an embodiment, block 1304 includes receiving capability information from the LP-WUR 150.

In an embodiment, the capability information indicates whether LP-WUR 150 can correctly process an advanced mode WUR packet. In an embodiment, the capability information indicates whether the LP-WUR 150 can correctly process a WUR packet that was transmitted at a second data rate that is higher than a fixed first data rate at which base mode WUR packets are transmitted. In an embodiment, the capability information indicates whether the LP-WUR 150 can correctly process a WUR packet that has a variable length that can be different than a fixed length of base mode WUR packets. In an embodiment, the capability information indicates the types of information in a WUR packet that the LP-WUR 150 can correctly process.

At block 1308, the network interface device 142 generates and transmits a WLAN packet that includes WUR capability information indicating the one or more WUR capabilities of the LP-WUR 150. In various embodiments, the wireless network interface device 142 of the client station 134-1 is configured to include the WUR capability information in a WLAN frame, which is then included in a WLAN packet. Examples of WLAN frames include an association request frame, a reassociation request frame, and/or another types of frame suitable for transmitting capability information.

Embodiment 1: A method, performed by a first communication device, for transmitting a wakeup radio (WUR) packet to a WUR of a second communication device, wherein the second communication device includes a separate wireless local area network (WLAN) network interface device coupled to the WUR, the method comprising: determining, at the first communication device, a physical layer (PHY) transmission mode for transmitting the WUR packet, wherein the determined PHY transmission mode is selected from a plurality of different PHY transmission modes; generating, at the first communication device, a first portion of the WUR packet, wherein the first portion of the WUR packet corresponds to a WLAN legacy PHY preamble of the WUR packet, and wherein the first portion spans a first frequency bandwidth; generating, at the first communication device, a second portion of the WUR packet, wherein the second portion of the WUR packet spans a second frequency bandwidth that is less than the first frequency bandwidth. Generating the second portion of the WUR packet includes: generating the second portion of the WUR packet to include a PHY sync signal that corresponds to the selected PHY transmission mode, wherein the PHY sync signal is selected from a plurality of different PHY sync signals that respectively correspond to the plurality of different PHY transmission modes; and generating a PHY data portion, within the second portion of the WUR packet, according to the selected transmission mode. The method further comprises: transmitting, by the first communication device, the WUR packet.

Embodiment 2: The method of embodiment 1, wherein: the plurality of PHY transmission modes includes a first PHY transmission mode and a second PHY transmission mode; the plurality of different PHY sync signals includes a first PHY sync signal corresponding to the first PHY transmission mode, and a second PHY sync signal corresponding to the second PHY transmission mode; when the determined PHY transmission mode is the first PHY transmission mode, generating the second portion of the WUR packet includes: generating the second portion of the WUR packet to include the first PHY sync signal, and generating the PHY data portion according to the first PHY transmission mode; and when the determined PHY transmission mode is the second PHY transmission mode, generating the second portion of the WUR packet includes: generating the second portion of the WUR packet to include the second PHY sync signal, and generating the PHY data portion according to the second PHY transmission mode.

Embodiment 3: The method of embodiment 2, wherein: the first PHY transmission mode corresponds to a first data rate; the second PHY transmission mode corresponds to a second data rate that is higher than the first data rate; when the determined PHY transmission mode is the first PHY transmission mode, generating the second portion of the WUR packet includes: generating the PHY data portion according to the first data rate; and when the determined PHY transmission mode is the second PHY transmission mode, generating the second portion of the WUR packet includes: generating the PHY data portion according to the second data rate.

Embodiment 4: The method of either of embodiments 2 or 3, wherein: the first PHY sync signal has a first duration; and the second PHY sync signal has a second duration that is shorter than the first duration.

Embodiment 5: The method of embodiment 4, wherein: the first PHY sync signal includes a sync pattern and a repetition of the sync pattern; and the second PHY sync signal includes a complement of the sync pattern.

Embodiment 6: The method any of embodiments 2-5, wherein: the first PHY transmission mode corresponds to a fixed duration of the PHY data portion; the second PHY transmission mode corresponds to a variable duration of the PHY data portion; when the determined PHY transmission mode is the first PHY transmission mode, generating the second portion of the WUR packet includes: generating the PHY data portion to have the fixed duration; and when the determined PHY transmission mode is the second PHY transmission mode, generating the second portion of the WUR packet includes: generating the PHY data portion to have a duration that is different than the fixed duration.

Embodiment 7: The method of embodiment 6, wherein generating the second portion of the WUR packet further includes: generating the PHY data portion to include an indication of the duration that is different than the fixed duration.

Embodiment 8: The method of any of embodiments 1-7, further comprising: receiving, at the first communication device, capability information from the second communication device, wherein the capability information indicates whether the WUR of the second communication device is capable of processing one or more PHY transmission modes among the plurality of different PHY transmission modes; wherein determining the PHY transmission mode for transmitting the WUR packet is based on the capability information received from the second communication device.

Embodiment 9: An apparatus, comprising: a network interface device associated with a first communication device. The network interface device comprises one or more integrated circuit (IC) devices configured to: determine a physical layer (PHY) transmission mode for transmitting a wakeup radio (WUR) packet, wherein the determined PHY transmission mode is selected from a plurality of different PHY transmission modes; generate a first portion of the WUR packet, wherein the first portion of the WUR packet corresponds to a wireless local area network (WLAN) legacy PHY preamble of the WUR packet, and wherein the first portion spans a. first frequency bandwidth; generate a second portion of the WUR packet, wherein the second portion of the WUR packet spans a second frequency bandwidth that is less than the first frequency bandwidth, and wherein generating the second portion of the WUR packet includes: generating the second portion of the WUR packet to include a PHY sync signal that corresponds to the selected PHY transmission mode, wherein the PHY sync signal is selected from a plurality of different PHY sync signals that respectively correspond to the plurality of different PHY transmission modes, and generating a PHY data portion, within the second portion of the WUR packet, according to the selected transmission mode. The one or more IC devices are further configured to: transmit the WUR packet to a second communication device that includes a WUR coupled to a WLAN network interface device.

Embodiment 10: The apparatus of embodiment 9, wherein: the plurality of PHY transmission modes includes a first PHY transmission mode and a second PHY transmission mode; the plurality of different PHY sync signals includes a first PHY sync signal corresponding to the first PHY transmission mode, and a second PHY sync signal corresponding to the second PHY transmission mode; wherein the one or more IC devices are further configured to, when the determined PHY transmission mode is the first PHY transmission mode: generate the second portion of the WUR packet to include the first PHY sync signal, and generate the PHY data portion according to the first PHY transmission mode; and wherein the one or more IC devices are further configured to, when the determined PHY transmission mode is the second PHY transmission mode: generate the second portion of the WUR packet to include the second PHY sync signal, and generate the PHY data portion according to the second PHY transmission mode.

Embodiment 11: The apparatus of embodiment 10, wherein: the first PHY transmission mode corresponds to a first data rate; the second PHY transmission mode corresponds to a second data rate that is higher than the first data rate; wherein the one or more IC devices are further configured to, when the determined PHY transmission mode is the first PHY transmission mode: generate the PHY data portion according to the first data rate; and wherein the one or more IC devices are further configured to, when the determined PHY transmission mode is the second PHY transmission mode: generate the PHY data portion according to the second data rate.

Embodiment 12: The apparatus of either embodiments 10 or 11, wherein: the first PHY sync signal has a first duration; and the second PHY sync signal has a second duration that is shorter than the first duration.

Embodiment 13: The apparatus of embodiment 12, wherein: the first PHY sync signal includes a sync pattern and a repetition of the sync pattern; and the second PHY sync signal includes a complement of the sync pattern.

Embodiment 14: The apparatus of any of embodiments 10-13, wherein: the first PHY transmission mode corresponds to a fixed duration of the PHY data portion; the second PHY transmission mode corresponds to a variable duration of the PHY data portion; wherein the one or more IC devices are further configured to, when the determined PHY transmission mode is the first PHY transmission mode: generate the PHY data portion to have the fixed duration; and wherein the one or more IC devices are further configured to, when the determined PHY transmission mode is the second PHY transmission mode: generate the PHY data portion to have a duration that is different than the fixed duration.

Embodiment 15: The apparatus of embodiment 14, wherein the one or more IC devices are further configured to: generate the PHY data portion to include an indication of the duration that is different than the fixed duration.

Embodiment 16: The apparatus of any of embodiments 9-15, wherein the one or more IC devices are further configured to: receive capability information from the second communication device, wherein the capability information indicates whether the WUR of the second communication device is capable of processing one or more PHY transmission modes among the plurality of different PHY transmission modes; determine the PHY transmission mode for transmitting the WUR packet based on the capability information received from the second communication device.

Embodiment 17: A method, performed by a communication device that includes i) a wakeup radio (WUR), and ii) a wireless local area network (WLAN) network interface device coupled to the WUR, the method comprising: receiving, at the WUR, a WUR packet, wherein the WUR packet includes: i) a first portion that a) spans a first frequency bandwidth, and b) includes a WLAN legacy PHY preamble, and a second portion that a) spans a second frequency bandwidth that is less than the first frequency bandwidth, and b) includes a PHY sync signal and a PHY data portion; determining, at the WUR, to which known PHY sync signal, from among a plurality of different known PHY sync signals, the PHY sync signal in the WUR packet corresponds, wherein the plurality of different known PHY sync portions respectively correspond to a plurality of different PHY transmission modes; determining, at the WUR, a PHY transmission mode, from among the plurality of different PHY transmission modes, according to which the WUR packet was transmitted using the determination of the known PHY sync signal to which the PHY sync signal in the WUR packet corresponds; and processing, at the WUR, the PHY data portion according to the determined PHY transmission mode.

Embodiment 18: The method of embodiment 17, wherein: the plurality of different PHY transmission modes includes a first PHY transmission mode and a second PHY transmission mode; the plurality of different known PHY sync signals includes a first known PHY sync signal corresponding to the first PHY transmission mode, and a second known PHY sync signal corresponding to the second PHY transmission mode; when the WUR determines that the PHY sync signal in the WUR packet corresponds to the first known PHY sync signal: determining the PHY transmission mode comprises determining that the WUR packet was transmitted according to the first PHY transmission mode, and processing the PHY data portion comprises processing the PHY data portion according to the first PHY transmission mode; and. when the WUR determines that the PHY sync signal in the WUR packet corresponds to the second known PHY sync signal: determining the PHY transmission mode comprises determining that the WUR packet was transmitted according to the second PHY transmission mode, and processing the PHY data portion comprises processing the PHY data portion according to the second PHY transmission mode.

Embodiment 19: The method of embodiment 18, wherein: the first PHY transmission mode corresponds to a first data rate; the second PHY transmission mode corresponds to a second data rate that is higher than the first data rate; when the WUR determines that the WUR packet was transmitted according to the first PHY transmission mode: processing the PHY data portion comprises processing the PHY data portion according to the first data rate; and when the WUR determines that the WUR packet was transmitted according to the second PHY transmission mode: processing the PHY data portion comprises processing the PHY data portion according to the second data rate.

Embodiment 20: The method of either of embodiments 18 or 19, wherein: the first known PHY sync signal has a first duration; and the second known PHY sync signal has a second duration that is shorter than the first duration.

Embodiment 21: The method of embodiment 20, wherein: the first PHY sync signal includes a sync pattern and a repetition of the sync pattern; the second PHY sync signal includes a complement of the sync pattern; and determining to which known PHY sync signal the PHY sync signal in the WUR packet corresponds comprises: determining whether the PHY sync signal in the WUR packet includes the sync pattern, and determining whether the PHY sync signal in the WUR packet includes the complement of the sync pattern.

Embodiment 22: The method of any of embodiments 18-21, wherein: the first PHY transmission mode corresponds to a fixed duration of the PHY data portion; the second PHY transmission mode corresponds to a variable duration of the PHY data portion; when the determined PHY transmission mode is the first PHY transmission mode: processing the PHY data portion comprises processing the PHY data portion according to the fixed duration; and when the determined PHY transmission mode is the second PHY transmission mode: processing the PHY data portion comprises determining a duration of the PHY data portion and processing the PHY data portion according to the determine duration.

Embodiment 23: The method of embodiment 22, wherein determining the duration of the PHY data portion includes: determining the duration of the PHY data portion based on an indication of the duration included in the PHY data portion.

Embodiment 24: The method of any of embodiments 17-23, wherein: the communication device is a first communication device; the packet is received from a second communication device; and the method further comprises: transmitting, by the WLAN network interface of the first communication device, capability information to the second communication device, wherein the capability information indicates whether the WUR of the first communication device is capable of processing one or more PHY transmission modes among the plurality of different PHY transmission modes.

Embodiment 25: An apparatus, comprising: a wakeup radio WUR associated with a wireless local area network (WLAN) network interface device: The WUR comprises one or more integrated circuit (IC) devices configured to: receive a WUR packet, wherein the WUR packet includes: i) a first portion that a) spans a first frequency bandwidth, and b) includes a WLAN legacy PHY preamble, and ii) a second portion that a) spans a second frequency bandwidth that is less than the first frequency bandwidth, and b) includes a PHY sync signal and a PHY data portion; determine to which known PHY sync signal, from among a plurality of different known PHY sync signals, the PHY sync signal in the WUR packet corresponds, wherein the plurality of different known PHY sync portions respectively correspond to a plurality of different PHY transmission modes; determine a PHY transmission mode, from among the plurality of different PHY transmission modes, according to which the WUR packet was transmitted using the determination of the known PHY sync signal to which the PHY sync signal in the WUR packet corresponds; and process the PHY data portion according to the determined PHY transmission mode.

Embodiment 26: The apparatus of embodiment 25, wherein: the plurality of different PHY transmission modes includes a first PHY transmission mode and a second PHY transmission mode; the plurality of different known PHY sync signals includes a first known PHY sync signal corresponding to the first PHY transmission mode, and a second known PHY sync signal corresponding to the second PHY transmission mode; wherein the one or more IC devices are further configured to, when the WUR determines that the PHY sync signal in the WUR packet corresponds to the first known PHY sync signal: determine that the WUR packet was transmitted according to the first PHY transmission mode, and process the PHY data portion according to the first PHY transmission mode; and wherein the one or more IC devices are further configured to, when the WUR determines that the PHY sync signal in the WUR packet corresponds to the second known PHY sync signal: determine that the WUR packet was transmitted according to the second PHY transmission mode, and process the PHY data portion according to the second PHY transmission mode.

Embodiment 27: The apparatus of embodiment 26, wherein: the first PHY transmission mode corresponds to a first data rate; the second PHY transmission mode corresponds to a second data rate that is higher than the first data rate; wherein the one or more IC devices are further configured to, when the WUR determines that the WUR packet was transmitted according to the first PHY transmission mode: process the PHY data portion according to the first data rate; and wherein the one or more IC devices are further configured to, when the WUR determines that the WUR packet was transmitted according to the second PHY transmission mode: process the PHY data portion according to the second data rate.

Embodiment 28: The apparatus of either of embodiments 26 or 27, wherein: the first known PHY sync signal has a first duration; and the second known PHY sync signal has a second duration that is shorter than the first duration.

Embodiment 29: The apparatus of embodiment 28, wherein: the first PHY sync signal includes a sync pattern and a repetition of the sync pattern; the second PHY sync signal includes a complement of the sync pattern; and wherein the one or more IC devices are further configured to: determine whether the PHY sync signal in the WUR packet includes the sync pattern, and determine whether the PHY sync signal in the WUR packet includes the complement of the sync pattern.

Embodiment 30: The apparatus of any of embodiments 26-29, wherein: the first PHY transmission mode corresponds to a fixed duration of the PHY data portion; the second PHY transmission mode corresponds to a variable duration of the PHY data portion; wherein the one or more IC devices are further configured to, when the determined PHY transmission mode is the first PHY transmission mode: process the PHY data portion according to the fixed duration; and wherein the one or more IC devices are further configured to, when the determined PHY transmission mode is the second PHY transmission mode: determine a duration of the PHY data portion, and process the PHY data portion according to the determine duration.

Embodiment 31: The apparatus of embodiment 30, wherein the one or more IC devices are further configured to: determine the duration of the PHY data portion based on an indication of the duration included in the PHY data portion.

Embodiment 32: The apparatus of any of embodiments 25-31, wherein: the communication device is a first communication device; the packet is received from a second communication device; and the apparatus further comprises WLAN network interface coupled to the WUR; the WLAN network interface is implemented on the one or more IC devices; and wherein WLAN network interface is further configured to: transmit capability information to the second communication device, wherein the capability information indicates whether the WUR of the first communication device is capable of processing one or more PHY transmission modes among the plurality of different PHY transmission modes.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method, performed by a first communication device, for transmitting a wakeup radio (WUR) packet to a WUR of a second communication device, wherein the second communication device includes a separate wireless local area network (WLAN) network interface device coupled to the WUR, the method comprising:

determining, at the first communication device, a physical layer (PHY) transmission mode for transmitting the WUR packet, wherein the determined PHY transmission mode is selected from a plurality of different PHY transmission modes that comprises a first PHY transmission mode and a second PHY transmission mode;

generating, at the first communication device, a first portion of the WUR packet, wherein the first portion of the WUR packet corresponds to a WLAN legacy PHY preamble of the WUR packet, and wherein the first portion spans a first frequency bandwidth;

generating, at the first communication device, a second portion of the WUR packet, wherein the second portion of the WUR packet spans a second frequency bandwidth that is less than the first frequency bandwidth, and wherein generating the second portion of the WUR packet includes:

generating the second portion of the WUR packet to include a PHY sync signal that corresponds to the selected PHY transmission mode, wherein the PHY sync signal is selected from a plurality of different PHY sync signals that respectively correspond to the plurality of different PHY transmission modes, the plurality of different PHY sync signals comprising i) a first PHY sync signal corresponding to the first PHY transmission mode, and ii) a second PHY sync signal corresponding to the second PHY transmission mode, wherein generating the second portion of the WUR packet comprises:

generating the second portion of the WUR packet to include the first PHY sync signal when the determined PHY transmission mode is the first PHY transmission mode, and generating the second portion of the WUR packet to include the second PHY sync signal when the determined PHY transmission mode is the second PHY transmission mode; and wherein generating the second portion of the WUR packet further comprises: generating a PHY data portion, within the second portion of the WUR packet, according to the selected transmission mode, including:
    generating the PHY data portion according to the first PHY transmission mode, when the determined PHY transmission mode is the first PHY transmission mode, and
    generating the PHY data portion according to the second PHY transmission mode, when the determined PHY transmission mode is the second PHY transmission mode; and
wherein the method further comprises: transmitting, by the first communication device, the WUR packet.

2. The method of claim 1, wherein:
the first PHY sync signal has a first duration; and
the second PHY sync signal has a second duration that is shorter than the first duration.

3. The method of claim 2, wherein:
the first PHY sync signal includes a sync pattern and a repetition of the sync pattern; and
the second PHY sync signal includes a complement of the sync pattern.

4. The method of claim 1, wherein:
the first PHY transmission mode corresponds to a fixed duration of the PHY data portion;
the second PHY transmission mode corresponds to a variable duration of the PHY data portion;
when the determined PHY transmission mode is the first PHY transmission mode, generating the second portion of the WUR packet includes:
    generating the PHY data portion to have the fixed duration; and
when the determined PHY transmission mode is the second PHY transmission mode, generating the second portion of the WUR packet includes:
    generating the PHY data portion to have a duration that is different than the fixed duration.

5. The method of claim 4, wherein generating the second portion of the WUR packet further includes:
generating the PHY data portion to include an indication of the duration that is different than the fixed duration.

6. The method of claim 1, further comprising:
receiving, at the first communication device, capability information from the second communication device, wherein the capability information indicates whether the WUR of the second communication device is capable of processing one or more PHY transmission modes among the plurality of different PHY transmission modes;
wherein determining the PHY transmission mode for transmitting the WUR packet is based on the capability information received from the second communication device.

7. An apparatus, comprising:
a network interface device associated with a first communication device, wherein the network interface device comprises one or more integrated circuit (IC) devices configured to:
    determine a physical layer (PHY) transmission mode for transmitting a wakeup radio (WUR) packet, wherein the determined PHY transmission mode is selected from a plurality of different PHY transmission modes that comprises a first PHY transmission mode and a second PHY transmission mode,
    generate a first portion of the WUR packet, wherein the first portion of the WUR packet corresponds to a wireless local area network (WLAN) legacy PHY preamble of the WUR packet, and wherein the first portion spans a first frequency bandwidth,
    generate a second portion of the WUR packet, wherein the second portion of the WUR packet spans a second frequency bandwidth that is less than the first frequency bandwidth, and wherein generating the second portion of the WUR packet includes:
        generating the second portion of the WUR packet to include a PHY sync signal that corresponds to the selected PHY transmission mode, wherein the PHY sync signal is selected from a plurality of different PHY sync signals that respectively correspond to the plurality of different PHY transmission modes the plurality of different PHY sync signals comprising i) a first PHY sync signal corresponding to the first PHY transmission mode, and ii) a second PHY sync signal corresponding to the second PHY transmission mode, wherein generating the second portion of the WUR packet comprises:
            generating the second portion of the WUR packet to include the first PHY sync signal when the determined PHY transmission mode is the first PHY transmission mode, and
            generating the second portion of the WUR packet to include the second PHY sync signal when the determined PHY transmission mode is the second PHY transmission mode, and
wherein the one or more IC devices are further configured to: generating a PHY data portion, within the second portion of the WUR packet, according to the selected transmission mode, including:
    generating the PHY data portion according to the first PHY transmission mode, when the determined PHY transmission mode is the first PHY transmission mode, and
    generating the PHY data portion according to the second PHY transmission mode, when the determined PHY transmission mode is the second PHY transmission mode; and
wherein the one or more IC devices are further configured to transmit the WUR packet to a second communication device that includes a WUR coupled to a WLAN network interface device.

8. The apparatus of claim 7, wherein:
the first PHY sync signal has a first duration; and
the second PHY sync signal has a second duration that is shorter than the first duration.

9. The apparatus of claim 8, wherein:
the first PHY sync signal includes a sync pattern and a repetition of the sync pattern; and
the second PHY sync signal includes a complement of the sync pattern.

10. The apparatus of claim 7, wherein:
the first PHY transmission mode corresponds to a fixed duration of the PHY data portion;
the second PHY transmission mode corresponds to a variable duration of the PHY data portion;
the one or more IC devices are further configured to, when the determined PHY transmission mode is the first PHY transmission mode:
    generate the PHY data portion to have the fixed duration; and
the one or more IC devices are further configured to, when the determined PHY transmission mode is the second PHY transmission mode:

generate the PHY data portion to have a duration that is different than the fixed duration.

11. The apparatus of claim 10, wherein the one or more IC devices are further configured to:
generate the PHY data portion to include an indication of the duration that is different than the fixed duration.

12. The apparatus of claim 7, wherein the one or more IC devices are further configured to:
receive capability information from the second communication device, wherein the capability information indicates whether the WUR of the second communication device is capable of processing one or more PHY transmission modes among the plurality of different PHY transmission modes;
determine the PHY transmission mode for transmitting the WUR packet based on the capability information received from the second communication device.

13. A method, performed by a communication device that includes i) a wakeup radio (WUR), and ii) a wireless local area network (WLAN) network interface device coupled to the WUR, the method comprising:
receiving, at the WUR, a WUR packet, wherein the WUR packet includes: i) a first portion that a) spans a first frequency bandwidth, and b) includes a WLAN legacy PHY preamble, and ii) a second portion that a) spans a second frequency bandwidth that is less than the first frequency bandwidth, and b) includes a PHY sync signal and a PHY data portion;
determining, at the WUR, to which known PHY sync signal, from among a plurality of different known PHY sync signals, the PHY sync signal in the WUR packet corresponds, wherein the plurality of different known PHY sync signals respectively correspond to a plurality of different PHY transmission modes, wherein the plurality of different PHY transmission modes comprises a first PHY transmission mode and a second transmission mode, and wherein the plurality of different known PHY sync signals comprises: a first known PHY sync signal corresponding to the first PHY transmission mode, and a second known PHY sync signal corresponding to the second PHY transmission mode;
determining, at the WUR, a PHY transmission mode, from among the plurality of different PHY transmission modes, according to which the WUR packet was transmitted using the determination of the known PHY sync signal to which the PHY sync signal in the WUR packet corresponds, comprising:
determining that the WUR packet was transmitted according to the first PHY transmission mode when the WUR determines that the PHY sync signal in the WUR packet corresponds to the first known PHY sync signal, and
determining that the WUR packet was transmitted according to the second PHY transmission mode when the WUR determines that the PHY sync signal in the WUR packet corresponds to the second known PHY sync signal; and
processing, at the WUR, the PHY data portion according to the determined PHY transmission mode, comprising:
processing the PHY data portion according to the first PHY transmission mode when the WUR determines that the PHY sync signal in the WUR packet corresponds to the first known PHY sync signal, and
processing the PHY data portion according to the second PHY transmission mode when the WUR determines that the PHY sync signal in the WUR packet corresponds to the second known PHY sync signal.

14. The method of claim 13, wherein:
the first known PHY sync signal has a first duration; and
the second known PHY sync signal has a second duration that is shorter than the first duration.

15. The method of claim 14, wherein:
the first PHY sync signal includes a sync pattern and a repetition of the sync pattern;
the second PHY sync signal includes a complement of the sync pattern; and
determining to which known PHY sync signal the PHY sync signal in the WUR packet corresponds comprises:
determining whether the PHY sync signal in the WUR packet includes the sync pattern, and
determining whether the PHY sync signal in the WUR packet includes the complement of the sync pattern.

16. The method of claim 13, wherein:
the first PHY transmission mode corresponds to a fixed duration of the PHY data portion;
the second PHY transmission mode corresponds to a variable duration of the PHY data portion;
when the determined PHY transmission mode is the first PHY transmission mode:
processing the PHY data portion comprises processing the PHY data portion according to the fixed duration; and
when the determined PHY transmission mode is the second PHY transmission mode:
processing the PHY data portion comprises determining a duration of the PHY data portion and processing the PHY data portion according to the determine duration.

17. The method of claim 16, wherein determining the duration of the PHY data portion includes:
determining the duration of the PHY data portion based on an indication of the duration included in the PHY data portion.

18. The method of claim 13, wherein:
the communication device is a first communication device;
the packet is received from a second communication device; and
the method further comprises:
transmitting, by the WLAN network interface of the first communication device, capability information to the second communication device, wherein the capability information indicates whether the WUR of the first communication device is capable of processing one or more PHY transmission modes among the plurality of different PHY transmission modes.

19. An apparatus, comprising:
a wakeup radio WUR associated with a wireless local area network (WLAN) network interface device, wherein the WUR comprises one or more integrated circuit (IC) devices configured to:
receive a WUR packet, wherein the WUR packet includes: i) a first portion that a) spans a first frequency bandwidth, and b) includes a WLAN legacy PHY preamble, and ii) a second portion that a) spans a second frequency bandwidth that is less than the first frequency bandwidth, and b) includes a PHY sync signal and a PHY data portion,
determine to which known PHY sync signal, from among a plurality of different known PHY sync signals, the PHY sync signal in the WUR packet corresponds, wherein the plurality of different known PHY sync signals respectively correspond to a plurality of different PHY transmission modes, wherein the plurality of different PHY transmission modes comprises a first PHY transmission mode and a second PHY transmission mode, and wherein the plurality of different known PHY sync signals comprises: a first known PHY sync signal corresponding to the first PHY transmission mode, and a second known PHY sync signal corresponding to the second PHY transmission mode,
- determine a PHY transmission mode, from among the plurality of different PHY transmission modes, according to which the WUR packet was transmitted using the determination of the known PHY sync signal to which the PHY sync signal in the WUR packet corresponds, comprising:
  - determining that the WUR packet was transmitted according to the first PHY transmission mode when the WUR determines that the PHY sync signal in the WUR packet corresponds to the first known PHY sync signal, and
  - determining that the WUR packet was transmitted according to the second PHY transmission mode when the WUR determines that the PHY sync signal in the WUR packet corresponds to the second known PHY sync signal; and
- wherein the one or more IC devices are further configured to: process the PHY data portion according to the determined PHY transmission mode, comprising:
  - processing the PHY data portion according to the first PHY transmission mode when the WUR determines that the PHY sync signal in the WUR packet corresponds to the first known PHY sync signal, and
  - processing the PHY data portion according to the second PHY transmission mode when the WUR determines that the PHY sync signal in the WUR packet corresponds to the second known PHY sync signal.

20. The apparatus of claim 19, wherein:
the first known PHY sync signal has a first duration; and
the second known PHY sync signal has a second duration that is shorter than the first duration.

21. The apparatus of claim 20, wherein:
the first PHY sync signal includes a sync pattern and a repetition of the sync pattern;
the second PHY sync signal includes a complement of the sync pattern; and
the one or more IC devices are further configured to:
  determine whether the PHY sync signal in the WUR packet includes the sync pattern, and
  determine whether the PHY sync signal in the WUR packet includes the complement of the sync pattern.

22. The apparatus of claim 19, wherein:
the first PHY transmission mode corresponds to a fixed duration of the PHY data portion;
the second PHY transmission mode corresponds to a variable duration of the PHY data portion;
the one or more IC devices are further configured to, when the determined PHY transmission mode is the first PHY transmission mode:
  process the PHY data portion according to the fixed duration; and
the one or more IC devices are further configured to, when the determined PHY transmission mode is the second PHY transmission mode:
  determine a duration of the PHY data portion, and
  process the PHY data portion according to the determine duration.

23. The apparatus of claim 22, wherein the one or more IC devices are further configured to:
determine the duration of the PHY data portion based on an indication of the duration included in the PHY data portion.

24. The apparatus of claim 19, wherein:
the communication device is a first communication device;
the packet is received from a second communication device; and
the apparatus further comprises a WLAN network interface coupled to the WUR;
the WLAN network interface is implemented on the one or more IC devices; and
the WLAN network interface is further configured to:
  transmit capability information to the second communication device, wherein the capability information indicates whether the WUR of the first communication device is capable of processing one or more PHY transmission modes among the plurality of different PHY transmission modes.

* * * * *